(12) United States Patent (10) Patent No.: US 7,722,025 B2
Giacometto et al. (45) Date of Patent: May 25, 2010

(54) APPARATUS FOR PROCESSING SHEETS INSERTED VERTICALLY, IN PARTICULAR AN AUTOMATIC VALIDATING MACHINE FOR DOCUMENTS, SUCH AS CHEQUES

(75) Inventors: Adriano Giacometto, Ivrea (IT); Paolo Poma, Ivrea (IT)

(73) Assignee: Telecom Italia S.p.A., Milan (IT)

( * ) Notice: Subject to any disclaimer, the term of this patent is extended or adjusted under 35 U.S.C. 154(b) by 565 days.

(21) Appl. No.: 11/632,311

(22) PCT Filed: Jul. 11, 2005

(86) PCT No.: PCT/EP2005/007478

§ 371 (c)(1),
(2), (4) Date: Jan. 12, 2007

(87) PCT Pub. No.: WO2006/005560

PCT Pub. Date: Jan. 19, 2006

(65) Prior Publication Data

US 2008/0048393 A1 Feb. 28, 2008

(30) Foreign Application Priority Data

Jul. 14, 2004 (IT) .......................... TO2004A0484

(51) Int. Cl.
*B65H 5/22* (2006.01)

(52) U.S. Cl. .......................... 271/3.15; 271/2; 271/227; 271/229

(58) Field of Classification Search ................. 194/242; 235/3; 271/2, 229, 227, 3.15
See application file for complete search history.

(56) References Cited

U.S. PATENT DOCUMENTS 3,360,099 A * 12/1967 Barr .......................... 198/463.3

(Continued)

FOREIGN PATENT DOCUMENTS

WO WO-2004/091919 10/2004

OTHER PUBLICATIONS

International Search Report dated Nov. 23, 2005, issued in PCT/EP2005/007478.

*Primary Examiner*—Patrick H Mackey
*Assistant Examiner*—Howard Sanders
(74) *Attorney, Agent, or Firm*—Venable LLP; Robert Kinberg; Steven J. Schwarz

(57) ABSTRACT

An apparatus (10) suitable to process sheets (13), in particular comprised of an validating machine (10) for the validation of documents (13) such as cheques or similar documents, comprising a vertical guide (11), and a pair of arms (22a, 22b) suitable to hold and support a cheque (13) along a respective lower edge (13a) in a first hold position (Pi), when the cheque (13) is inserted into the vertical guide (11), wherein in response to the presence and alignment of the cheque (13) in said first position (Pi), two pairs of rotating rollers (42a, 42b, 44a, 44b) automatically engage the cheque (13) from opposite sides, the arms (22a, 22b) are moved out of contact with the lower edge (13a) of the cheque (13), in order to free the feeding path of the cheque towards the interior of the validating machine, and the cheque is also fed vertically, in a downward direction, by means of the two pairs of rollers from the said first position (P1) to a second processing position (P2) in the validation zone for being validated. The cheque (13) inserted into the validating machine (10) can also be moved in a horizontal direction, for example, in order to perform the detection of data recorded on the cheque (13) by means of a magnetic detection unit (76). The validating machine (10) permits easy and practical manual insertion of the document to be validated from above, in a vertical direction, still at the same time ensuring correct and safe alignment of said document in the vertical guide, whereupon it activates and controls in a completely automatic manner the related validation cycle.

31 Claims, 11 Drawing Sheets

U.S. PATENT DOCUMENTS

| | | |
|---|---|---|
| 4,044,620 A | 8/1977 | F'Geppert |
| 4,944,620 A | 7/1990 | Scozzafava et al. |
| 5,080,513 A | 1/1992 | Clary et al. |
| 5,294,204 A | 3/1994 | Clary |
| 5,399,038 A | 3/1995 | Clary et al. |
| 5,421,699 A | 6/1995 | Guiles et al. |
| 5,807,457 A | 9/1998 | Norman, Jr. et al. |
| 5,965,862 A * | 10/1999 | Momose ............... 235/449 |
| 6,015,143 A * | 1/2000 | Jimenez et al. ........... 271/4.1 |
| 6,253,899 B1 * | 7/2001 | Bellis ..................... 194/206 |
| 6,290,129 B2 * | 9/2001 | Momose ............... 235/449 |
| 7,007,788 B2 * | 3/2006 | Dunlop et al. ........... 194/207 |
| 2004/0212141 A1 * | 10/2004 | Graef et al. ............. 271/121 |
| 2004/0212142 A1 * | 10/2004 | Graef et al. ............. 271/121 |
| 2006/0049572 A1 * | 3/2006 | Miyazawa ............... 271/121 |

* cited by examiner

APPARATUS FOR PROCESSING SHEETS INSERTED VERTICALLY, IN PARTICULAR AN AUTOMATIC VALIDATING MACHINE FOR DOCUMENTS, SUCH AS CHEQUES

FIELD OF THE INVENTION

The present invention relates in general to an apparatus suitable to process sheets, and more in particular to a processing apparatus suitable to receive the sheets to be processed from above, in a vertical direction.

The present invention also relates to an alignment and feeding device for aligning and feeding documents that are dropped in a vertical guide under the force of gravity.

Preferably the invention finds application in an apparatus for performing validation of documents, in particular cheques or similar documents, and for this reason is also referred to for the sake of brevity as a validating machine, wherein the documents to be validated are inserted into the validating machine from above, in a vertical direction.

Within the present invention, under the term "validating machine", apparatuses which confirm the acceptance of a document are meant, according to various modes, for example by printing on the document a pre-defined written text, or by recording on the document some type of data (such as a code, date, or similar) or by detecting or acquiring data or images already present on the same document, as well as a general purpose printer or document detector, or also other functionally similar apparatuses, such as punching machines, stamping machines, bar code readers, scanners, etc.

TECHNICAL BACKGROUND OF THE INVENTION AND STATE OF THE ART

Validating machines are known which are comprised of printers suitable to apply on a document a written text, a symbol, or in general any other type of mark suitable to indicate that the document has been correctly validated in the context of a more general processing system of the said document.

For example, said written text or phrase applied on a cheque can indicate that the cheque has been validly entered, or actually registered by the bank where the validating machine is installed.

A validating machine as above is described for example in the U.S. Pat. No. 4,044,620.

These validating machine are typically equipped with an opening through which the operator, such as a bank employee for example, inserts the document to be validated.

The document received in this manner is processed by the validating machine in cooperation with the management system within which the validating machine is installed, and is thus validated.

Considering the enormous number of documents requiring validation in rapid succession such as can practically occur, it is important for the validating machines to be able to minimize the onus of manual operations, and in particular, that their interface with the respective operator is such as to create working and use conditions that are as easy and practical as possible for the latter.

In particular, the Applicant has felt that in the field of validating machines, there is a need for these apparatuses to be constructed in a manner to enable the operator to insert the documents to be validated in very comfortable, rapid and safe conditions, and in particular, providing a good control of the document during the insertion step, in order to minimize the risk of insertion errors that could compromise or simply delay the validation operation.

From U.S. Pat. No. 5,294,204 a printer is known, intended to validate cheques or similar documents, wherein the cheques are inserted manually from above, or simply dropped inside a vertical guide of the said printer.

Upon the insertion or dropping in the vertical guide, the cheque comes to rest along its respective lower edge on a support base facing a print head, and in this position the cheque is printed by the print head, thus receiving a first printed line.

During this step, an interline device, comprising a plurality of rotating rollers arranged on the opposite sides with respect the vertical guide, is immediately activated to press the rollers against the cheque in order to retain it, and to rotate the rollers in such a manner that the cheque is raised with respect to the print head, thus allowing it to be printed with a second line just below the first printed line.

The Applicant noted that although the printer described and shown in this patent has the advantage of having a very compact structure, it has the drawback that the vertical guide is rather deep, at least when compared to the height of the cheque, and thus only a very small part of the cheque still protrudes from the top of the guide once it has been inserted thereinto.

This vertical guide configuration appears, overall, to limit the operator's possibility of maintaining good manual control and a correct grip on the cheque during the step of insertion into the vertical guide, or at least, it appears to force the operator to pay special care and attention to ensure that the manual insertion of the cheque occurs without problems and ends with a correct alignment of the cheque with the bottom of the guide.

Moreover, the walls of this vertical guide, because of the considerable depth, can cause excessive friction on the cheque, and in particular can disturb its dropping motion in the vertical guide, thus causing an incorrect alignment of the cheque on the bottom of the guide.

Printers intended to receive documents to be validated from the top along a vertical guide, in a manner similar to that of the printer in the previous U.S. Pat. No. 5,294,204, are described in U.S. Pat. No. 4,944,620 and U.S. Pat. No. 5,399,038.

Also, a printer is known from U.S. Pat. No. 5,080,513, for printing data both on a sheet and on a tape from a roll, wherein the sheet is intended to be inserted along a vertical guide of the printer in front of the tape, and a printing unit of the printer is provided for printing data on the sheet during a first step, and during a subsequent second step, after the sheet has been removed from in front of the tape, in order to print the data on the tape itself as well.

Moreover, in the field of validating machines, and more in general, in the field of document or sheet processing apparatuses, devices are known which act to receive and preliminary align the documents or sheets, before proceeding with feeding them towards another processing station or zone, where they are actually processed, e.g. printed or put into an envelope.

A device such as above is for example known from U.S. Pat. No. 5,421,699.

In particular, with reference to this field, the Applicant observed that many of these known aligning devices, such as that described in the aforementioned U.S. Pat. No. 5,421,699, are of a construction that is rather complex and expensive, and in contrast thereto have a rather simplified system to check the correct alignment of the received document or sheet, for this reason, sometimes responsible for errors.

SUMMARY OF THE INVENTION

The Applicant therefore perceived the problem of creating an apparatus for processing sheets, for example a validating machine for document validation, such as for cheques and similar, which is practical and easy to use for an operator, and in particular, which permits comfortable insertion from above of the sheet or document to be validated, still maintaining good manual control of the sheet or document during insertion.

The Applicant also perceived the problem of creating an apparatus for processing sheets which, besides permitting practical manual sheet insertion, can ensure safe and correct alignment of the inserted sheet or document before proceeding with its further processing, which can be performed in a position at a distance from the insertion position.

In view of said problems, the present invention relates to an apparatus for processing a sheet which has a vertical guide suitable to receive the sheet from above, and a stop member provided for holding the sheet along the vertical guide in a first hold position, wherein in response to the detection of the alignment status of the sheet in the hold position, the sheet is retained and transferred from the first hold position to a second processing position, below the hold position and suitable for cooperation of the sheet with a processing member of the apparatus.

In more detail, in a first aspect, the invention relates to an apparatus for processing on a sheet, comprising:

a vertical guide for sheet insertion;

A stop member to stop the sheet in a hold position along the vertical guide, and suitable for contact cooperation with a lower edge of the sheet;

a presence sensor to detect the presence and alignment of the sheet in the hold position with respect to a predetermined reference line;

a transfer device that can be selectively engaged with the sheet; and a processing member suitable to perform an operation on the same sheet and located at a processing position of the sheet spatially separated from the related hold position, wherein the stop member can be switched from a stop position of the lower edge of the sheet to a release position of said lower edge; and wherein the processing device further comprises:

a control and command device associated with the stop member and with the transfer device, to command switching of the stop member from the stop position to the release position, and the action of said transfer device to transfer the sheet from the hold position to the processing position, in response to the presence sensor detecting the presence and alignment of the sheet in the related hold position.

Preferably the presence sensor comprises at least two distinct sensitive elements, longitudinally separated and arranged along the predetermined reference line to detect the alignment of the lower edge of the sheet in contact with the stop member.

In turn, preferably, the stop member includes at least two rotating arms, suitable to jointly rotate, wherein the two sensitive elements of the presence sensor are each associated with a respective rotating arm.

According to a preferred embodiment, the control and command device comprises a command member having a first cam to command switching of the transfer device between an open configuration suitable for the insertion of the sheet in the vertical guide, and a closed configuration, engaging the sheet in the hold position, and a second cam to command switching of the stop member from the stop position and the release position of the lower edge of the sheet.

Moreover, preferably the processing apparatus subject of the present invention includes a device that has the function of moving the sheet in a horizontal direction after it has been inserted in the vertical guide of the apparatus and successively transferred to the related processing position, adjacent to the processing member.

In a second aspect, the invention relates to a device for aligning and feeding sheets, comprising:

a vertical guide for the insertion from above of a sheet dropped under the force of gravity;

a stop member associated with the vertical guide and movable between a first stop position, where the stop member is in contact cooperation with the lower edge of the sheet to stop and align the sheet in a determined hold position, and a second release position, where the stop member does not stop the sheet and therefore allows it to travel downstream of the stop member;

a presence sensor for detecting the presence and alignment of the sheet in the hold position with respect to a predetermined reference line; and a sheet transfer device associated with the vertical guide, wherein the presence and alignment sensor comprises at least two sensitive elements, each of which is provided to emit a corresponding signal upon contact of the sheet with the stop member, and wherein, in response to the presence of both signals emitted by the two sensitive elements, the transfer device is switched from an open configuration, suitable for the insertion of the sheet into the vertical guide, to a closed configuration, engaging the sheet, the stop member is switched from the first stop position to the second release position, and furthermore the transfer device is activated to feed the sheet towards the zone downstream of the stop member.

In a third aspect, the invention relates to a method for feeding a sheet into a processing device of the type having a vertical guide and a processing member, wherein the method provides for the following steps:

inserting the sheet from above into the vertical guide;

stopping the sheet at a first hold position along the vertical guide, by contact cooperation with a lower edge of the sheet;

detecting the presence of the sheet in the first hold position, and the alignment of its lower edge with respect to a predetermined reference line;

and, upon detection of the presence and alignment of the sheet:

retaining sheet in the first hold position;

releasing the lower edge of the sheet from the stop condition; and transferring the sheet from the first hold position to a second processing position, suitable for the cooperation between the sheet and the processing member.

BRIEF DESCRIPTION OF APPENDED DRAWINGS

These and other features will be made clearer from the following description of an exemplary embodiment with reference to the figures in the appended drawings, wherein.

DETAILED DESCRIPTION OF A PREFERRED EMBODIMENT OF THE INVENTION

Figure 1:
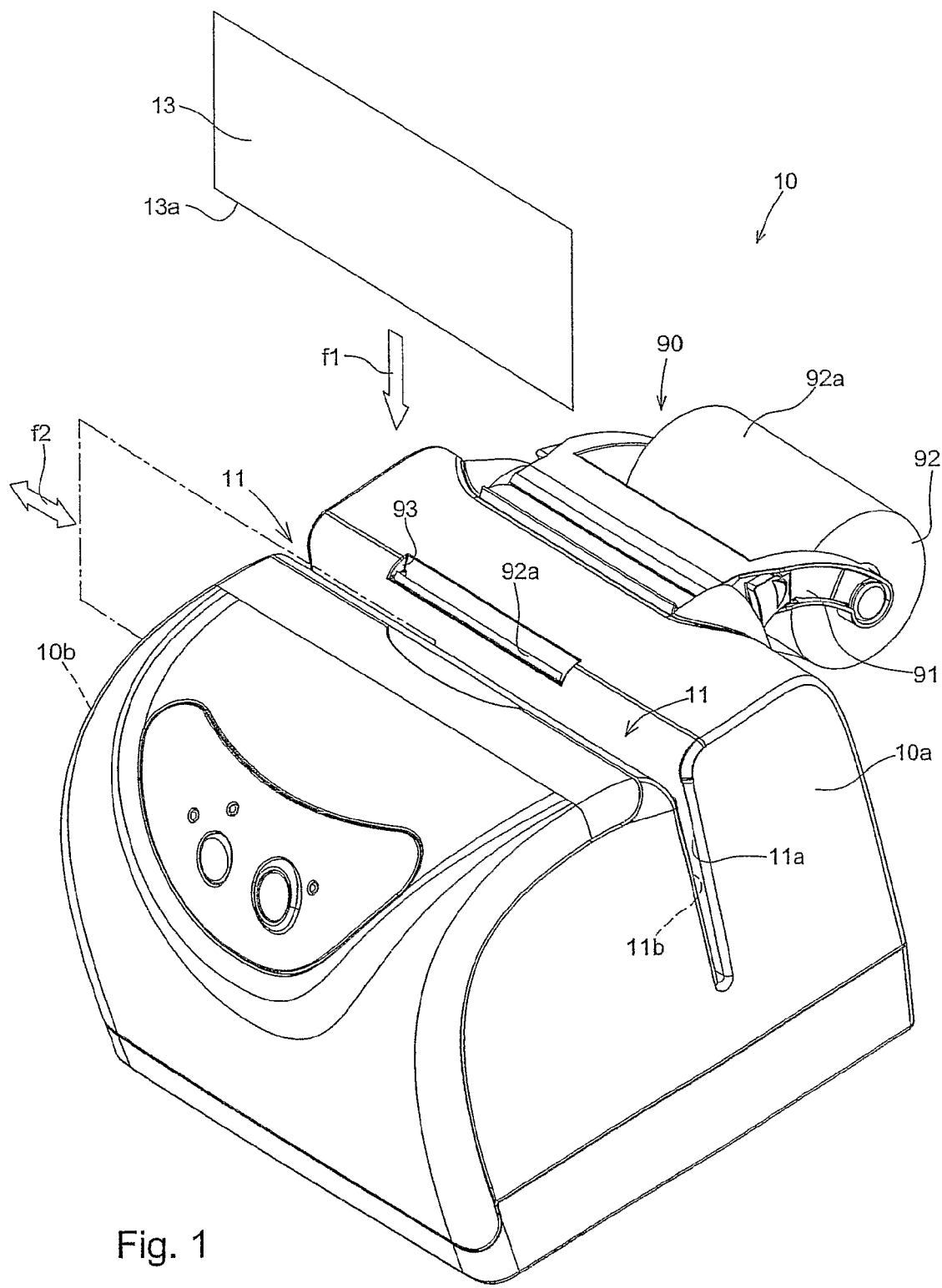
FIG. 1 is a perspective view of an apparatus for processing sheets, made according to the present invention, and namely comprised of a validating machine for validation of documents, in particular cheques, suitable for receiving from above, along a vertical guide, the documents to be validated.
Figure 2:
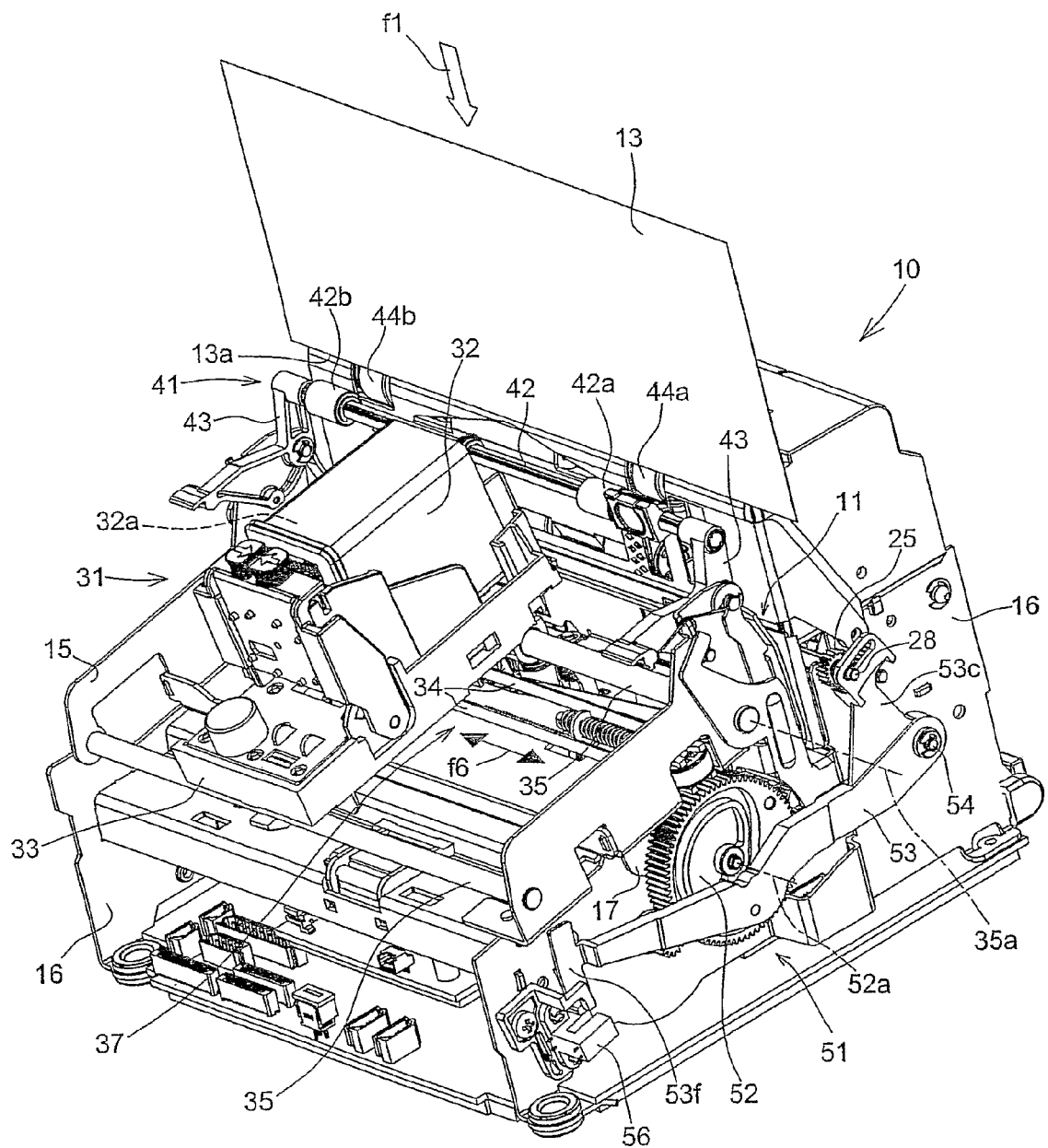
FIG. 2 is a perspective view of the validating machine in FIG. 1, without the external casing.

With reference to FIGS. 1 and 2, an apparatus suitable to process sheets made according the present invention is shown and identified as a whole by reference numeral 10.

Preferably, but not exclusively, the sheet processing apparatus 10 according to the invention is embodied in the form of a validating machine suitable to perform validation or confirmation of documents such as cheques, wherein the sheets processed by the validating machine 10 are in fact composed of the documents to be validated.

The validating machine 10 of the invention is configured in a manner to receive the documents or sheets to be validated from above, as shown by arrow f1, and to this aim, it comprises a vertical guide 11, that extends along a vertical plane and inside which a user can insert a document to be validated from above or simply drop it under the force of gravity.

The vertical guide 11 is configured as a vertical slot so as to define two sides 11a and 11b, which are suitable to receive between them the document or sheet that is inserted or dropped by the user inside guide 11.

The document or sheet that is inserted vertically in the validating machine 10 to be validated is identified by reference numeral 13, and is typically comprised of a cheque, or a similar document.

However, other types of documents, also for purposes and uses very different from cheques, can be processed by the validating machine 10 to be validated, or to be printed with a printed text, image or similar.

The validation performed by the validating machine 10 consists in applying or printing a determined text, in other words a sequence of alphanumerical characters, or an image, for example a logo, a symbol, or similar, on the cheque 13, upon its acceptance as a valid document, while in turn, said text or image applied to the cheque performs the task of confirming the completed validation thereof.

Of course other forms of validation, for example based on recording other data or information, including non-printed one, on the document to be validated, or based on simple reading of data already present on the latter, can also be performed by the apparatus according to the present invention.

More in general, even though the preferred example described herein relates to a validation apparatus for bank use, wherein confirmation of completed acceptance is typically made in the form of a text or image impressed on the surface of the cheque by meats of a printing device, preferably an ink-jet printing device, the present invention can also be applied to other apparatuses intended for stamping, marking, cutting or somehow processing a sheet inserted thereinto.

The guide 11 is open along both sides 10a and 10b of the validating machine 10, as shown in FIG. 1, in order to permit the validating machine 10 to receive vertically, along the guide 11, those cheques 13 having a width that is greater than that of the casing of the validating machine 10.

Furthermore, thanks to this configuration of the vertical guide 11, open at the sides, it is also possible to move the cheque 13 horizontally in both directions after its insertion in the validating machine 10, as shown by double arrow f2 in FIG. 1 and described in more detail below, for example to perform reading of data stored on the cheque 13, or to transfer the same cheque 13 sideways, again in a horizontal direction, to other apparatuses.

Figure 8:
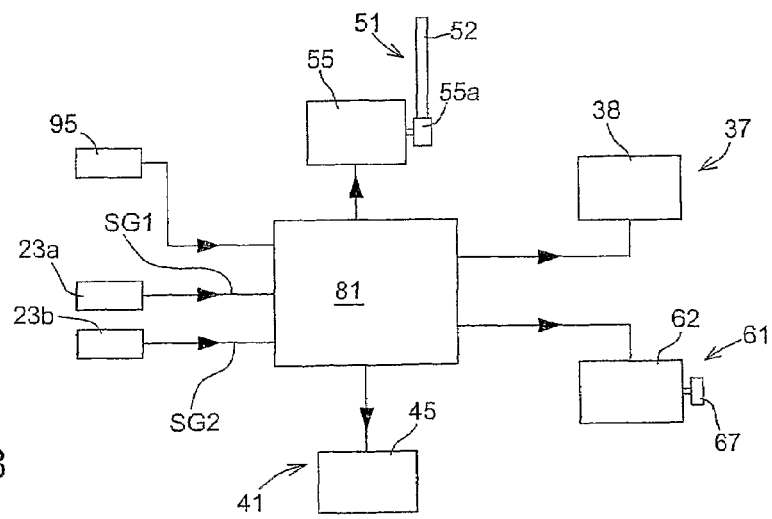
FIG. 8 is a block diagram of the electrical circuit of the validating machine shown in FIG. 1.
Figure 3F:
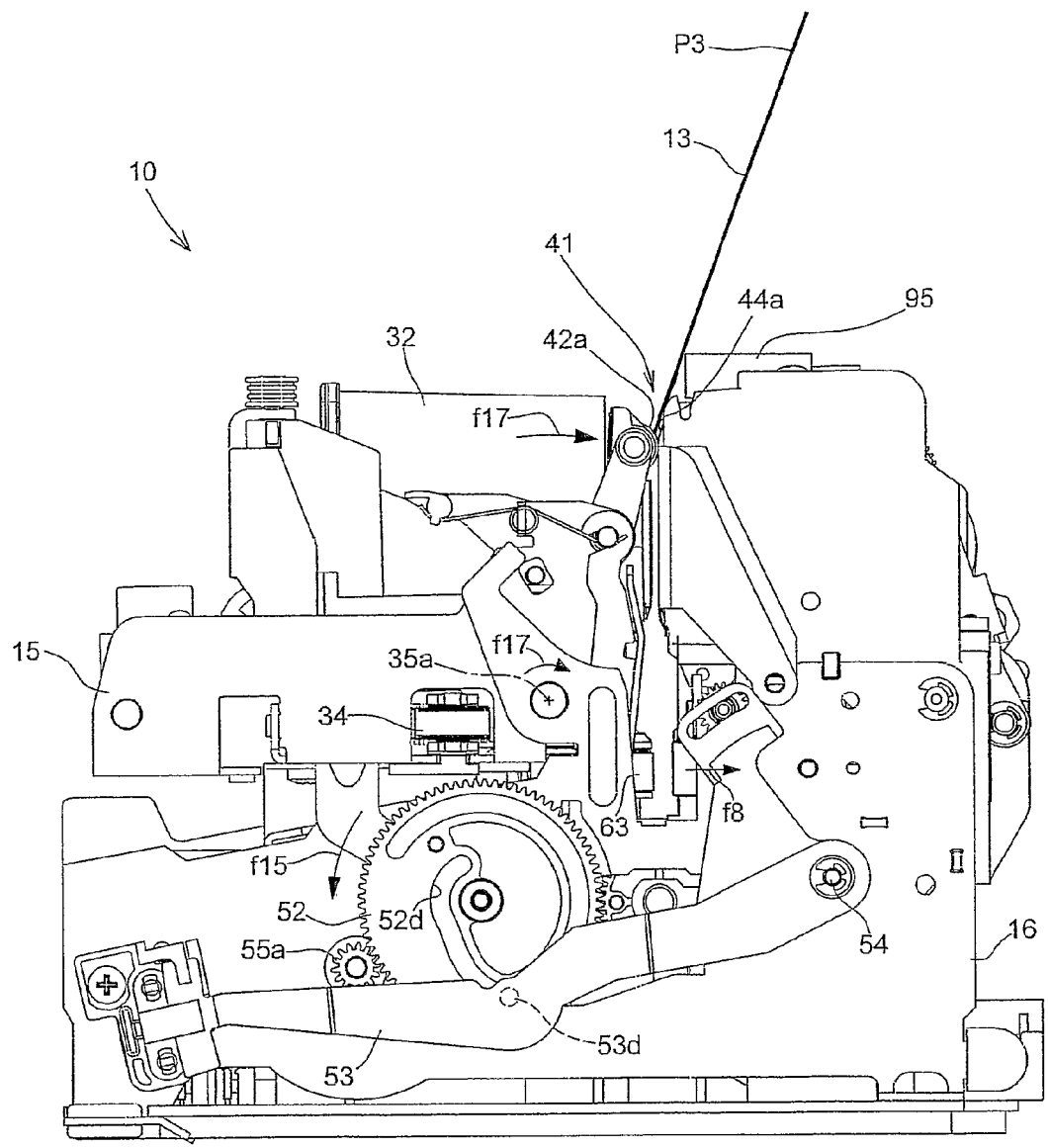
FIG. 3f is a fifth side view of the validating machine in FIG. 2, shown in a fifth and final configuration with the document, now validated, released from the validating machine.

The validating machine 10 comprises a fixed structure 16 (FIG. 2) to support the various parts, both fixed and movable, of the validating machine 10; a hold and alignment device associated with the vertical guide 11 and generally indicated by reference numeral 21 (FIG. 4); a processing member, for example composed of a printing device or assembly 31 (FIG. 2) to perform the printing on the cheque 13 for validation; a retaining and feeding device, also referred to in general as transfer device, indicated as a whole by reference numeral 41, for retaining the cheque 13 after its insertion into the vertical guide 11, and to feed it in a vertical direction to and from the printing zone; a command device, generally indicated by reference numeral 51, and described below in greater detail, for performing a plurality of related functions, associated with the insertion of the cheque 13 into the validating machine 10, and its validation; and finally an electronic control unit 81, shown schematically in FIG. 8, for controlling the validating machine 10 operation.

A presence sensor 95 (FIG. 3a) is mounted in an upper zone on the validating machine 10, adjacent to the entry of the vertical guide 11, and has the function of detecting the presence or lack of presence of the cheque 13 in the guide 11, in order to manage certain operations of validating machine 10 which are directly connected with its presence, as will be explained in greater detail below.

Optionally the validating machine 10 can also comprise a horizontal transfer device, generally indicated by reference numeral 61 (FIG. 7) which is intended to move the cheque 13 horizontally once it is correctly positioned vertically with respect to the printing zone, or to the printing assembly 31.

Hold and Alignment Device.

The hold and alignment device 21 is intended to receive and hold the cheque 13 when it is inserted manually from above, or simply dropped into the vertical guide 11, as well as to align it correctly along an essentially horizontal direction in the said vertical guide 11.

Figure 3A:
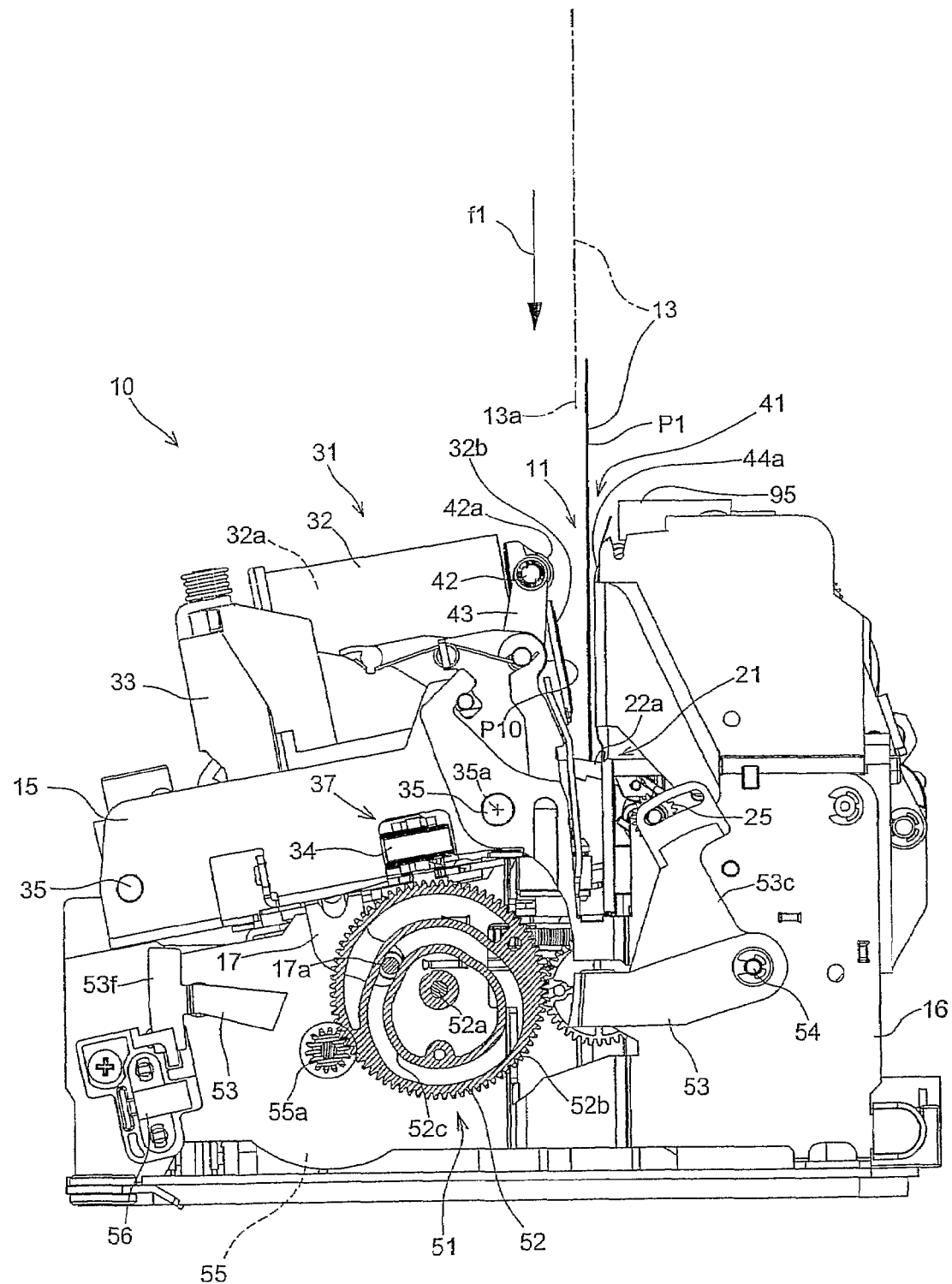
FIG. 3a is a first side view of the validating machine in FIG. 2, shown in a first initial configuration arranged to receive a document to be validated from above, along the vertical guide.
Figure 3B:
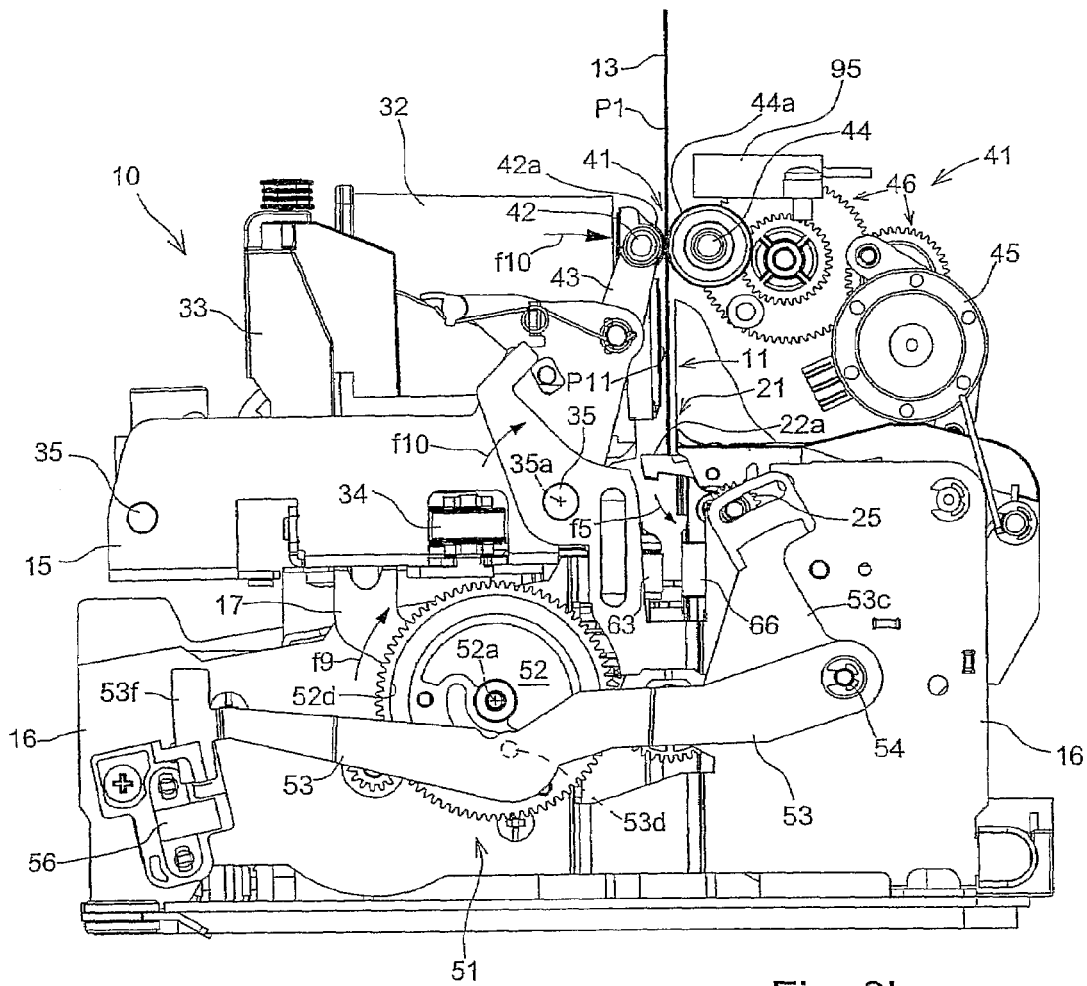
FIG. 3b is a second side view of the validating machine in FIG. 2, shown in a second configuration with the document to be validated inserted in the vertical guide, resting at the bottom on hold arms, and retained at both sides by a vertical feeding device.
Figure 4:
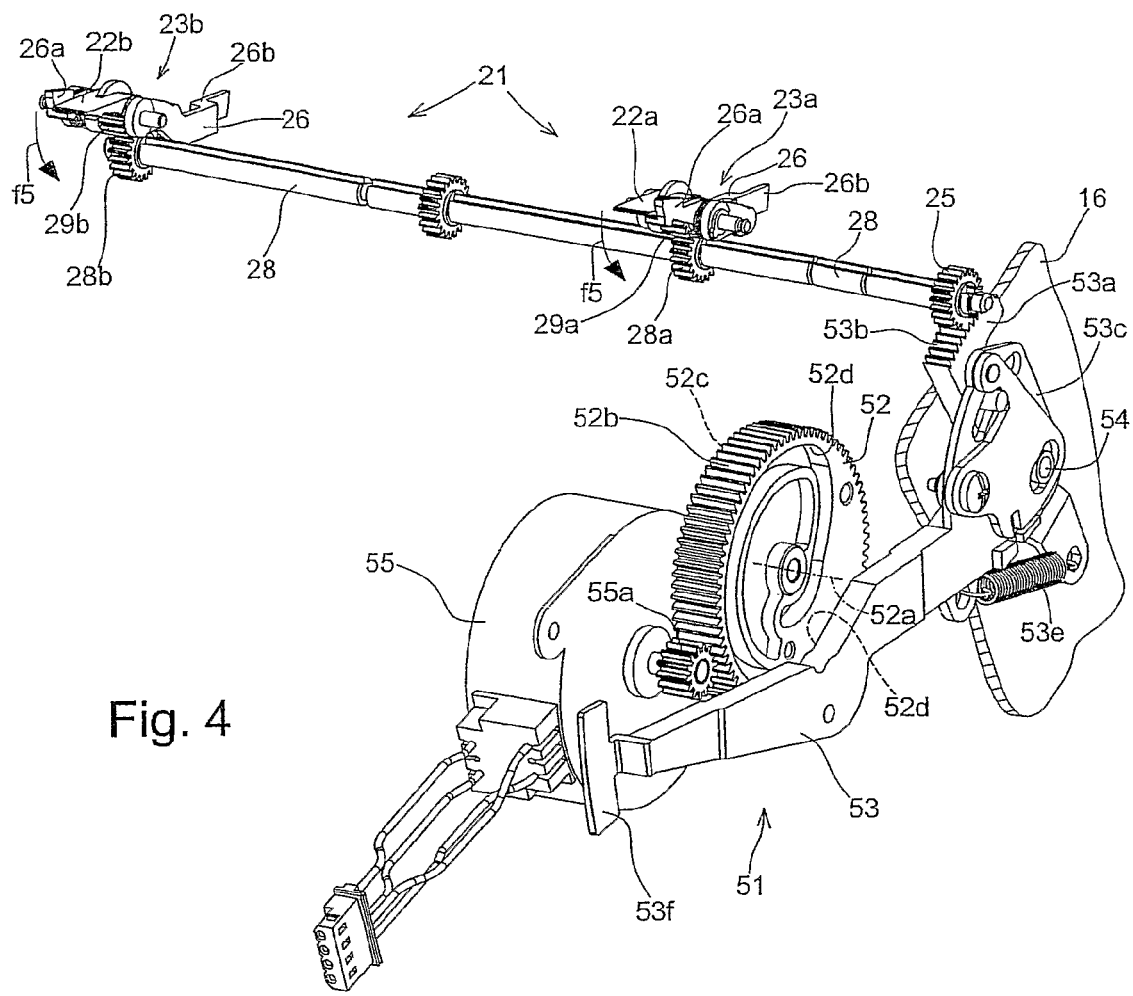
FIG. 4 is a perspective view of a hold and alignment device for the document inserted in the vertical guide of the validating machine shown in FIG. 1, and the related kinematic drive chain.

For this purpose, with reference to FIGS. 3a, 3b, and 4, the hold and alignment device 21 comprises a stop member to stop the cheque 13 inserted in the vertical guide 11, and sensor means to detect the presence and alignment of the cheque 13, once it has been stopped by the stop member.

In particular, the stop member comprises two arms 22a and 22b, jointly movable and which are associated with the vertical insertion path of the cheque 13 in the validating machine 10, and which are such as to hold and support the cheque 13 from below, by contact cooperation with the lower edge 13a of the cheque 13 when it is inserted manually from above into the vertical guide 11.

The two arms 22a and 22b are usually arranged perpendicular to the vertical insertion path for the cheque 13 in the validating machine 10, as shown in FIGS. 3a and 4, so as to stop cheque 13 when it is at first manually inserted into the guide 11.

Furthermore, the two arms 22a and 22b are mounted so that they jointly rotate with respect to the fixed structure 16 of the validating machine 10, and in particular, in use they are commanded to rotate by the command device 51, as described in more detail below.

For greater clarity, FIG. 4 shows the kinematic chain that connects the command device 51 to the two arms 22a and 22b.

In particular, this kinematic chain comprises a command lever 53, which is described in detail below with reference to the command device 51, and which is pivoted on the fixed structure 16 at a fulcrum 54, and is equipped at one end 53a, with a sector gear 53b that meshes with a gear 25, keyed onto one end of a small rotating shaft 28.

In turn the small rotating shaft 28 has two sprockets 28a and 28b solid thereon, each meshing with a corresponding sector gear, in the order 29a and 29b, each being formed externally on the same component that forms arm 22a or 22b, respectively.

The two arms 22a and 22b are pivoted on a frame, not shown in the drawings, which is solid with the fixed structure 16, in such a manner that a rotation of the command lever 53 about the fulcrum 54, for example in counter-clockwise direction, provokes a corresponding rotation in the same angular direction (counter-clockwise) of the two arms 22a and 22b.

In turn, the sensor means of device 21, that are intended to detect the presence and alignment of the cheque 13, comprises two document presence sensors 23a and 23b, each one being associated with a respective arm 22a and 22b, which are intended for detecting the presence of cheque 13 in contact, along the lower edge 13a, with the respective arm 22a and 22b.

Figure 5:
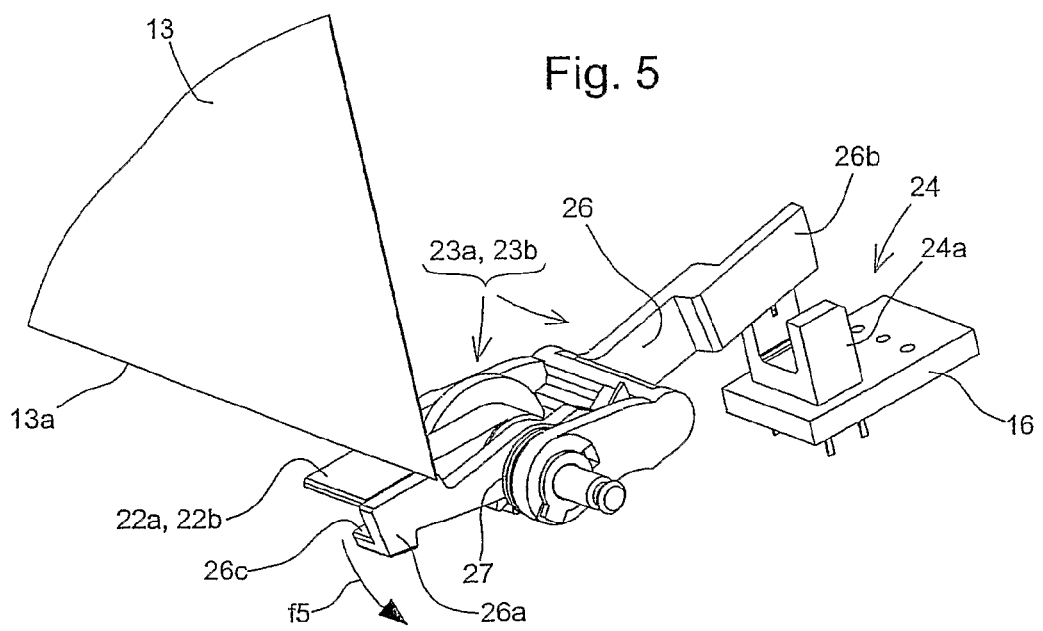
FIG. 5 is an enlarged perspective view of a detail comprised of a presence and alignment sensor, associated with the hold and alignment device shown in FIG. 4.

For the sake of clarity, any of these presence sensors 23a and 23b, associated with the respective arm 22a and 22b, is shown in enlarged scale and in detail in FIG. 5.

In particular, each sensor 23a and 23b comprises for example an optical device 24, having known features and for example composed of a fork 24a, which is mounted on the fixed structure 16 of the validating machine 10, as well as an articulated lever 26, which is pivotally mounted about the same rotation axis as the respective arm 22a and 22b.

The articulated lever 26 is composed of two parts, paddle-shaped, respectively a front part 26a and a rear part 26b, arranged on opposite sides with respect to the rotation axis of the articulated lever 26, and of a spring 27 positioned between said two parts 26a and 26b for the purpose of maintaining them normally connected and solid one another, still allowing a relative rotation between them, in special situations as will be described below.

The front part 26a is intended for contact cooperation with the lower edge 13a of the cheque 13 when it is inserted in the guide 11, while the rear part 26b is intended to cooperate with the optical device 24 in order to emit a corresponding signal.

The front part 26a of the articulated lever 26 of each sensor 23a and 23b also has a projection 26c, intended for contact cooperation with a corresponding one of arms 22a, 22b.

Therefore during the validating machine operation, and as will be described more clearly below, when the arms 22a and 22b are rotated in a downward direction as shown by arrows f5 (FIGS. 3b and 4) to be removed from the lower edge 13a of the cheque 13, these relieves 26c cause, together with the elastic and articulated structure of the levers 26, the front parts 26a to be entrained into rotation together with the respective arms 22a and 22b, in contrast with the elastic action exerted by the springs 27, while the rear parts 26b are held by suitable abutments.

In this manner, the front parts 26a of the articulated levers 26 of the sensors 23a and 23b rotate jointly with the respective arms 22a and 22b, thus completely freeing the zone in the vertical guide 11, and thus allowing the cheque 13 to be further fed towards the interior of the validating machine.

The weight of the rear part 26b facing the fork 24a side, is greater than that of the front part 26a, facing the vertical guide 11 side, and therefore, in normal conditions, i.e. when there is no cheque in the guide 11 and the arms 22a and 22b are oriented perpendicular to the vertical insertion path of the cheque 13 in the guide 11, the lever 26 of each sensor 23a, 23b, by being free to rotate around its axis exclusively under the action of its own weight, arranges itself naturally in a balanced position with the rear part 26b resting on the fixed structure 16 in the fork 24a zone, and the front part 26a slightly raised with respect to the respective arms 22a, 22b.

The difference in weight between the two parts 26a and 26b is very slight, approximately a few grams, and in any case, less than the weight of the cheque 13, so that each sensor 23a and 23b is sensitive to the weight of the cheque 13, as will be explained below.

Therefore, when a cheque 13 is actually inserted vertically into the guide 11, the arms 22a and 22b, by being arranged perpendicular to such an insertion path, intervene to stop the cheque 13 along the respective lower edge 13a.

In particular, cheque 13, initially, inferiorly rests on the front part 26a of the lever 26 of each sensor 23a, 23b, so that the lever 26, because of the weight of the cheque 13, rotates about its rotation axis until lever 26 is aligned with the corresponding arm 22a, 22b, and therefore the cheque rests in a stable manner on the arms 22a, 22b.

Moreover, because of this rotation, the rear part 26b of lever 26 of each sensor 23a, 23b moves with respect to the related optical device 24 just enough to trigger the emission of two corresponding signals SG1 and SG2 by the two sensors 23a, 23b (FIG. 8).

In this manner, the simultaneous presence of the signals SG1 and SG2 generated by the sensors 23a and 23b permits the electronic unit 81 that controls the validating machine 10 to establish that the cheque 13 is actually present and in contact with the arms 22a and 22b, and is also correctly aligned on the latter along the lower edge 13a.

Printing Assembly

The printing assembly 31 comprises a serial type print head 32, i.e. suitable to travel in both directions for a determined printing stroke with respect to the cheque 13 in order to print one or more printed lines on the cheque.

For this reason, the head 32 is removably mounted on a movable carriage 33, which is in turn associated with a transport device 37 suitable to move the carriage 33 back and forth in a horizontal direction along guides 35 as shown by the double arrows f6, and therefore to allow the print head 32 to print a printed line and a corresponding validation text on the cheque 13.

For example, said transport device 37 comprises a transport motor 38 (FIG. 8) and a belt 34 to transmit the motion from the transport motor 38 to carriage 33.

The print head 32 is of a known type, based on ink-jet technology, and therefore only a few simple details concerning the head will be supplied, omitting the great majority as well known and of no special importance for the present invention.

Simply for information purposes, the print head 32 has a front surface 32b (FIG. 3a) suitable to translate in front of the cheque 13 to be printed, and which is configured with a plurality of nozzles, for example 75 in number, which are arranged in two parallel and adjacent rows oriented perpendicular to the translation motion of head 32, in a manner so that they are able to cover a printing band or line with a height of ½" according to a graphic resolution defined by a printing matrix equal to 150×150 dpi (dot per inch) for example.

The print head 32 is also associated with an internal tank 32a solid to the head 32, suitable to supply the necessary ink for printing, and which has a capacity of for example 18 ml.

Advantageously, once the ink in the related tank 32a is exhausted, the print head 32 is of the type that can be refilled by placing it in a specific refill container, such as that described in the Italian patent application, filed in the name of the Applicant under number TO2003 A 000303.

Alternatively, the print head can be of the disposable type, intended to be completely replaced once the ink has been exhausted.

The print head 32, and in general, the whole structure of the printing assembly 31, are supported by a movable structure 15, which is pivoted on the fixed structure 16 at a fulcrum defined by the axis 35a of one of the guides 35, in particular, that closest to the printing zone, on which the carriage 33 bearing the print head 32 slides.

The movable structure 15 bearing the print head 32 is suitable to be commanded selectively by the command device 51 so that it will rotate about the fulcrum 35a with respect to the fixed structure 16, thus allowing the insertion from above of the cheque 13 into the vertical guide 11, as will be described in greater detail below.

In particular, the movable structure 15 comprises along one side, an arm 17 bearing at one end, a pin 17a that is in contact cooperation with a rotating cam of the command device 51, so that the rotation of said cam determines a corresponding rotation of the movable structure about the fulcrum 35a.

Vertical Feeding Device for the Document to be Validated

The vertical holding and feeding device 41, also simply referred to as transfer device, is associated with the vertical guide 11 and operates to hold the cheque 13, and retain it stably, after it has been inserted manually into guide 11, and to guide and translate the cheque 13 in a vertical direction with respect to the printing or validation zone.

In particular, the vertical holding and feeding device 41, is intended to feed the cheque 13 downwards in a precise and controlled manner, after it has been inserted into the guide 11, in order to bring it in the correct position and at the correct height in a vertical direction with respect to the print head 32, so that the cheque 13 can be correctly validated by the latter.

In greater detail, the vertical holding and feeding device 41 comprises a small shaft 42 that bears two pressure rollers 42a and 42b, and that is mounted at its two ends on respective support elements 43, in turn hinged on the movable structure 15.

These support elements 43 are associated with elastic means, such as springs for example, that for simplicity are not shown in the drawings, and which are intended to press the pressure rollers 42a and 42b elastically against the cheque 13 when the movable structure 15 is rotated about axis 35a, in order to close the rollers 42a and 42b against the cheque 13 and therefore retain it in a stable position, as will be described more clearly below.

The vertical holding and feeding device 41 also comprises two feeder rollers, respectively 44a and 44b, which are mounted rigidly on a shaft 44, which is in turn pivotally supported on the fixed structure 16, and is intended to be commanded to rotate by means of a gear chain 46 by a vertical feeder motor 45, also supported on the fixed structure 16.

Command Device

As stated previously, the command device 51 performs a plurality of functions associated with the insertion of the cheque 13 in the validating machine 10, and the subsequent validation by means of the print head 32.

In particular, the command device 51 is intended to be controlled by the electronic control unit 81 and comprises a cam command member 52, more simply referred to hereafter as a command member, which is suitable to rotate to command a plurality of driving members, which will be described below, and a command motor 55 which is suitable to command, in response to control signals received from the electronic unit 81, the rotation of the command member 52.

Figure 7:
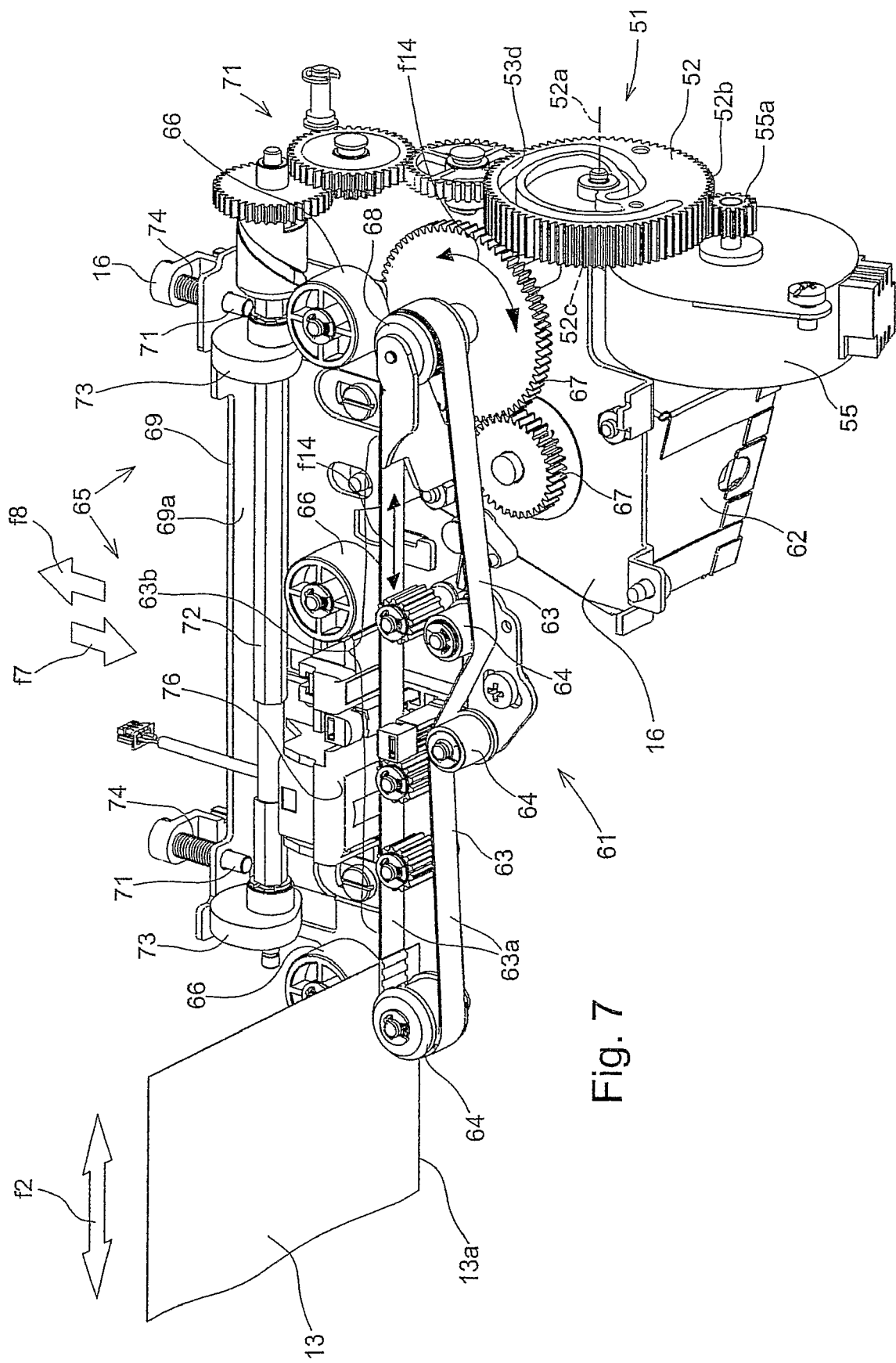
FIG. 7 is a partial perspective view of a device incorporated in the validating machine shown in FIG. 1 and intended to move the document in a horizontal direction, after its insertion thereinto.

The command member 52 is composed of a disk-shaped body which is pivotally mounted on the fixed structure 16 about an axis 52a and which comprises an external toothing 52b, which in turn meshes with a pinion 55a of the command motor 55, as can be clearly seen in FIG. 7, in order to permit driving of the command member 52 by means of rotation of the same command motor 55.

Moreover, the command member 52 is equipped with two cams, in particular a first internal cam 52c and a second external cam 52d, also simply referred to hereafter as internal profile and external profile, and which are configured like two grooves respectively along the two sides of the command member 52.

The first internal cam 52c has a closed profile about axis 52a and extends on the side of the command member 52 facing the interior of the validating machine 10.

This internal cam 52c, clearly visible in FIG. 3a where the command member 52 is shown in a cross section, is intended for contact cooperation with the pin 17a of the arm 17 solid to the movable structure 15 that bears the printing unit 31.

On the other hand the second external cam 52d has a profile open about axis 52a, between two ends 52e and 52f, and extends on the side of the command member 52 facing the exterior of the validating machine 10.

Figure 6:
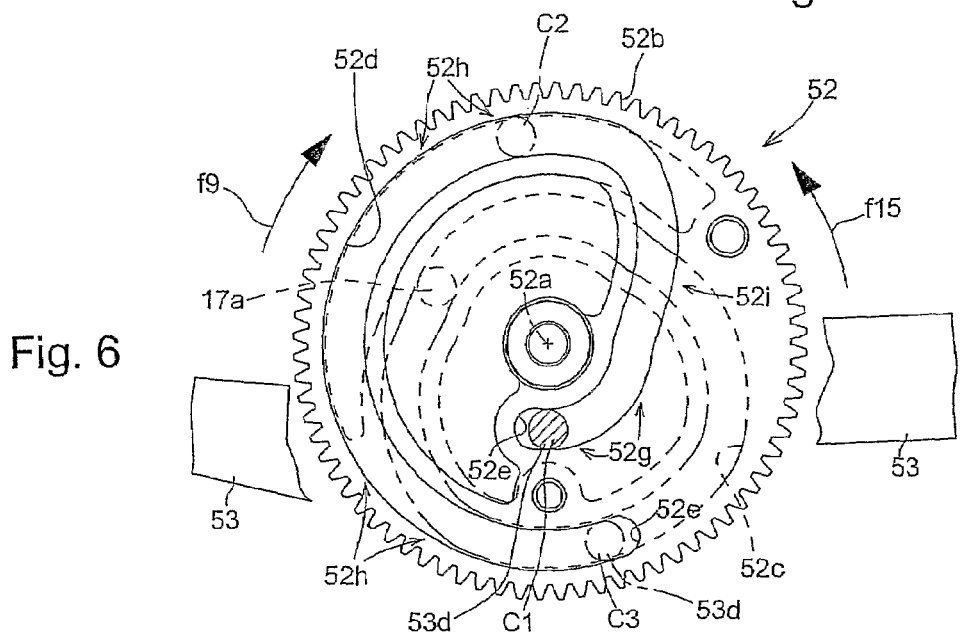
FIG. 6 is a front view of a cam command member part of a command device of the validating machine shown in FIG. 1.

More in detail, and as clearly shown in FIG. 6, the profile of this second external cam 52d comprises a first circular portion 52g, adjacent to the end 52e and positioned in a radial direction near axis 52a; a second circular portion 52h, adjacent to the end 52f and positioned in a radial direction at a distance from the axis 52a; and also a third portion 52i that defines a connecting ramp between the two circular portions 52g and 52h.

The external cam 52d is intended to control the command lever 53, in turn previously introduced when describing the hold and alignment device 21 and pivoted on the fixed structure 16 at fulcrum 54.

For this purpose, a pin 53d (FIG. 6) of the actuating lever 53 is suitable for continuous contact cooperation with the profile defined by the external cam 52d during the rotation of the command member 52.

In turn the command lever 53 comprises an arm 53c having the sector gear 53b formed on its end.

The latter, as already described with reference to the hold and alignment device 21, meshes with the toothed wheel 25 fixed on the small shaft 28 bearing the crown gears 28a and 28b, which in turn are intended to rotate the arms 22a and 22b suitable to stop and support the cheque 13, when it is inserted into the guide 11.

Advantageously, the arm 53a is elastically coupled, by means of a spring 53e, with respect to the remaining part of the command lever 53, as shown in FIG. 4.

In fact this elastic coupling permits the command lever 53 to become elastically deformed when critical situations occur such as holding and/or blocking of the document inside the validating machine 10, in this way preventing the validating machine 10 mechanisms from becoming subject to dangerous stress, and at the same time, facilitating the operations for removing said problems.

The command lever 53 also comprises end 53f suitable to cooperate with a sensor 56 fixed to the fixed structure 16 in order to generate a zero signal, that corresponds with the resetting of the command device 51, and therefore also of the validating machine 10, obtained at the conclusion of the initial reset cycle, as described in greater detail below.

Device for Horizontal Travel of the Cheque

As stated previously, the validating machine 10 can also integrate within its structure, a device 61 having the specific function of moving the cheque 13 along a horizontal direction, after the cheque has been completely inserted in the validating machine 10 along the vertical guide 11, and therefore when it is correctly positioned in a vertical direction with respect to the print head 32 in order to be validated.

This horizontal travel device 61 has the advantage of considerably extending the printing performance on the cheque 13.

In fact, thanks to said horizontal travel, adjacent portions of a same cheque 13 can be subsequently positioned in the printing zone facing the head 32, in this way allowing to print on the whole area of cheques with a width that may even be considerably larger than the width of the validating machine 10.

Moreover, the horizontal travel device 16 lends itself to be advantageously used for translating the cheque 13 in front of a magnetic reading unit, also known as MICR for "Magnetic Ink Character Recognition", that can be optionally mounted in the validating machine 10 in order to perform reading of data magnetically stored on the cheque 13, and thus validating it, as described in greater detail below.

In detail, with reference to FIG. 7, the horizontal travel device 61 comprises a specific horizontal travel motor 62, a belt 63 of the type with a closed loop externally flat band 63a, suitable for contact cooperation with the cheque 13 to move it; a plurality of tension rollers 64 intended to tension and support the flat belt 63 so that it forms a closed path; a plurality of counter-rollers 66 suitable to cooperate selectively in pressure relationship with the belt 63 to move the cheque 13 in a horizontal direction; and an engagement mechanism 65 to move the pressure counter-rollers 66 selectively towards and away from the belt 63, as shown by the two arrows f7 and f8 respectively, in order to engage the counter rollers 66 with the belt 63, through interposition of cheque 13, or to move away and accordingly release the counter rollers 66 from the belt 63 as will be better described below.

The axes of the tension rollers 64 are oriented in a vertical direction so that the belt 63 forms a closed path lying along a horizontal plane, and in a corresponding manner the band 63a of belt 63 results oriented in a vertical direction along the respective thickness.

Moreover, this closed path of belt 63 is configured so that it defines a straight portion 63b, at which the belt 63 is suitable to cooperate with the counter-rollers 66 in order to move the cheque 13 back and forth in a horizontal direction, as shown by the double arrow f2.

The belt 63 is intended to be commanded and moved along the related closed path by the motor 62 by means of a set of gears 67 that connect the motor 62 with a pulley 68 on which the flat belt 63 is wrapped.

The horizontal motion motor 62, the belt 63 and the various tension rollers 64 that define the closed path of the belt 63 are mounted on the fixed structure 16 of the validating machine 10, while the counter-rollers 66 are mounted on a movable frame 69, suitable to slide along two pins 71 with respect to the fixed structure 16.

The engagement mechanism 65 is intended to be commanded by the cam command member 52 by means of gear chains 71 that are driven by the external toothing 52b of the command member 52, and comprises a shaft 72 pivotally mounted on the sliding frame 69, and bearing two protruding elements 73 eccentrically arranged with respect to the shaft 72 axis.

The two protruding elements 73 are suitable for contact cooperation with a folded over edge 69a of the frame 69, to slide the frame 69 in both directions, as shown by the two arrows f7 and f8 along the pins 71, in response to a rotation of shaft 72, and against the elastic force exerted by two helicoidal springs 74 mounted on the pins 71.

As previously stated, in this manner the two counter-rollers 66 are moved back and forth to selectively cooperate with belt 63.

Electronic Control Unit

FIG. 8 schematically shows the connections and signals exchanged between the electronic control unit 81 and the other electrical parts of the validating machine 10.

In particular, the electronic unit 81 is intended to control the following electric motors, already introduced previously when describing the various devices that comprise the validating machine 10: the motor 55 suitable to command the command device 51; the transfer motor 34 for the carriage 33 that bears the print head 32 of the printer device 31; the vertical feeder motor 45 that drives the feeder device 41; and the horizontal travel motor 62 that moves the cheque 13 in a horizontal direction.

The electric control unit 81 is also suitable to receive the signals from the sensor 95, and as already stated, the SG1 and SG2 signals emitted by the sensors 23a and 23b associated with the hold arms 22a and 22b.

Device for Printing Paper Tape from a Roll

According to a variant, the apparatus for processing sheets, or validating machine 10 can optionally incorporate and integrate within its structure a device for printing on a tape from a paper roll, which can also be simply referred to as roll printer device, in order to also print receipts or other types of tickets using the same device or validating machine.

Figure 9:
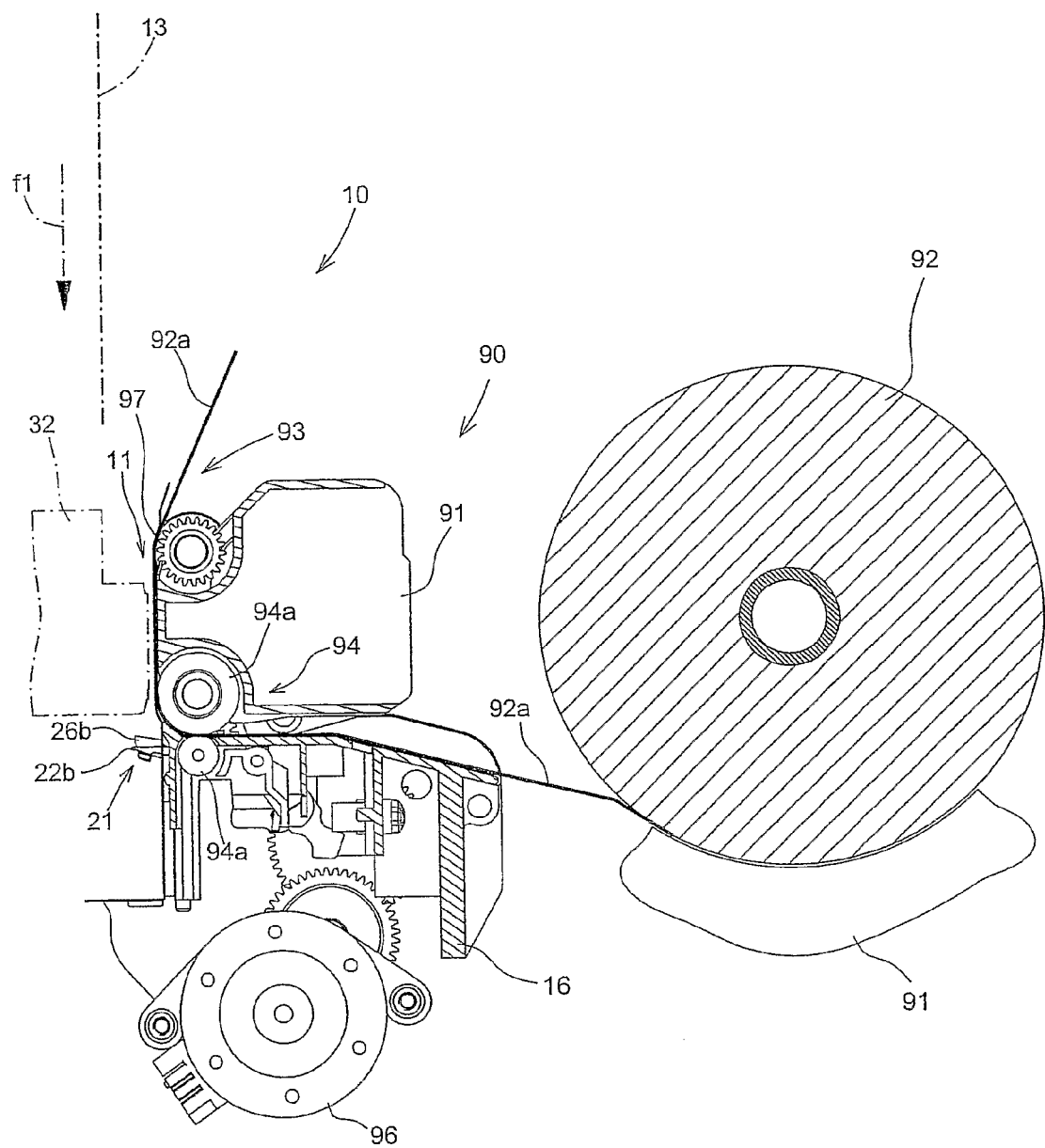
FIG. 9 is a partial cross section of an optional device for printing from a roll mounted on the processing apparatus shown in FIG. 1.

This optional device for roll printing, indicated by reference numeral 90, has essentially known features, and is shown in FIG. 1 partially covered by the casing of the validating machine 10, as well as in the cross-section of FIG. 9, where it is shown in greater detail.

The device 90 for roll printing essentially comprises a support structure 91, solid to the fixed structure 16 of the validating machine 10, and suitable to house and bear a roll of paper 92; a feeding and unrolling device 94, having known features, which is intended to unroll a paper tape 92a from the roll 92, to feed the tape in front of the print head 32 to be printed, and to release the tape after printing, outside the validating machine 10, through an exit opening 93 formed in the casing of the validating machine 10.

A cutting device, also having known features, and for example composed of a cutting edge solid to the external casing of the validating machine 10, can be foreseen in the zone of the exit opening 93 for cutting the printed paper tape 92a to form a ticket.

The feeding and unrolling device 94 is for example, motorised by a specific motor 96, and comprises a plurality of rotating rollers 94a suitable for contact cooperation with the tape 92a to make it move along a respective travel path between roll 92 and the zone of exit 93.

In particular, this travel path includes a vertical portion that extends parallel to the guide 11 and along which the print head 32 is positioned facing the tape 92a to print it.

A small guide plate 97 is intended to properly guide the paper tape 92a along this vertical portion of its travel path, and is equipped with a front opening to allow the print head 32 to print the tape 92a at said portion.

The small guide plate 97, is also intended to maintain the paper tape 92a separate from the guide zone 11 so that it does not interfere with the sheet 13 when it is inserted into the vertical guide 11 from above.

The paper roll 92 is conveniently positioned on the fixed structure 16 of the validating machine 10 so that the travel path of paper tape 92a, and in particular, the related vertical portion parallel to the guide 11, are positioned and extend between the arms 22a and 22b of the hold and alignment device 21, so that they do not interfere with the movement of said arms 22a and 22b and in general of the hold and alignment device 21 for the sheet 13 inserted into the vertical guide 11.

As stated previously, the device 90 comprises a useful option for the validating machine 10 of the invention, an option that results as particularly advantageous whenever the validation processing of the document or cheque 13 needs to be associated with other operations such as the emission of a ticket, or whenever, in the work context in which the validating machine 10 is used, it is convenient to perform validation operations and ticket emission on a single apparatus.

Furthermore the device 90 can be applied without interfering with the alignment and transfer members of the sheet or document 13, by virtue of their specific configuration.

Other Optional Devices

Optionally the validating machine 10 can include and integrate within its structure a device for reading data magnetically stored on cheques 13.

As mentioned above, a MICR type magnetic detector identified by reference numeral 76, can be associated with the horizontal travel device 61, and can for example, be mounted on the same sliding frame 69 that bears the counter-rollers 66 suitable to selectively engage with the belt 63 of device 61.

With this configuration, when the sliding frame 69 is commanded to move the counter-rollers 66 towards belt 63, and therefore hold the cheque 13, consequently, the reading unit 76 also gets adjacent to the cheque 13 so that it is able to read the data stored on the cheque while it is moved horizontally by means of device 61.

Moreover, the validating machine 10 can be optionally associated with an external detection device or scanner, for example positioned along a side 10a or 10b of the validating machine 10 and suitable to receive from the latter, along a horizontal direction, a cheque 13 or any other document to be read.

In particular in this case, the document to be read can be easily transferred by the horizontal travel device 61 described previously, from the validating machine 10 to the reading device, and vice-versa through the side openings formed in the vertical guide 11 along the sides 10a and 10b of the validating machine 10.

Operation of the Validating Machine of the Invention

The operation of the validating machine of the invention will now be described in detail with reference to the flow chart shown in FIG. 10 and to FIGS. 3a-3f.

Figure 10:
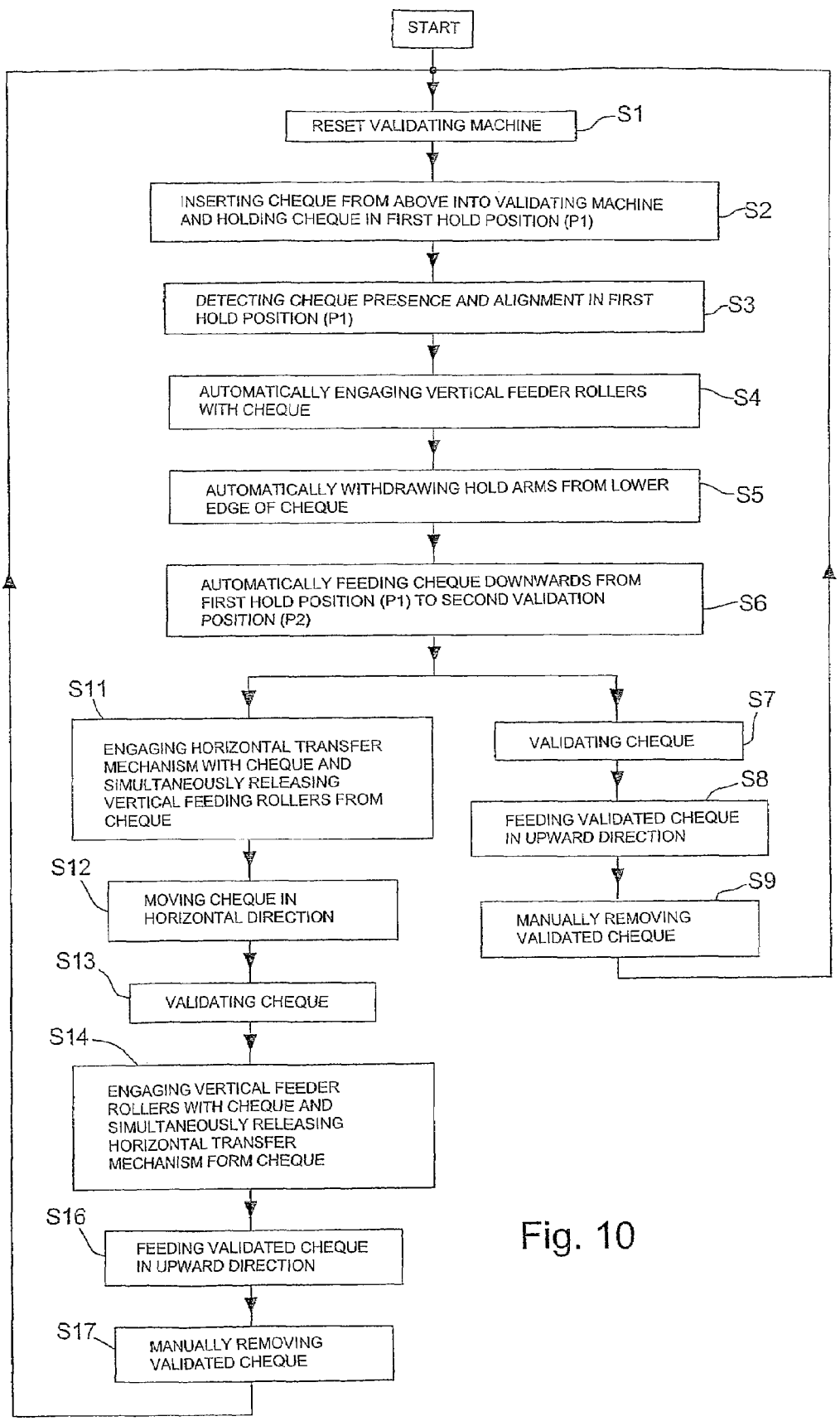
FIG. 10 is a flow chart that synthetically represents the operation of the validating machine shown in FIG. 1 for validating documents.

At the beginning of each validation cycle, the validating machine 10 performs an initial reset cycle, indicated with S1 in the flow chart in FIG. 10, in order to enter an initial setting or configuration wherein the validating machine 10 is ready to receive the document or cheque 13 from above.

In this initial setting of validating machine 10 shown in FIG. 3a, the movable structure 15 is in an open position, and therefore the idle rollers 42a, 42b borne by the same movable structure 15 are at a distance from the corresponding motorised rollers 44, 44b, borne by the fixed structure 16, so as to leave the passage free for the insertion of the cheque 13 into the vertical guide 11.

At the open position of the movable structure 15, the print head 32 is placed in a rest position P10, set back, so that it does not interfere in the zone of the vertical guide 11, and thus ease insertion of the cheque 13 thereinto.

Again in this initial setting of the validating machine 10, the arms 22a and 22b are positioned crosswise with respect to the guide 11 so as to stop the insertion path of the cheque 13 along the vertical guide 11.

Again, in this initial setting of the validating machine 10, the cam command member 52 is arranged in a determined initial angular position, which is also obtained during the initial reset cycle described above.

In particular, the initial reset cycle, which as specified previously determines the initial configuration of the validating machine 10, comprises an angular rotation in an counterclockwise direction, as shown in FIG. 6, of the cam command member 52, such as to slide the pin 53d of the command lever 53 along the external cam 52d, so that the pin 53d is positioned in the cylindrical portion 52g, closest to the rotation axis 52a, of the external cam 52d, adjacent to the closed end 52e of said portion 52g.

This initial or zero position of pin 53d, along the external cam 52d, is indicated by C1 in FIG. 6 and the fact that it has been reached is signalled by sensor 56 cooperating with the end 53f of the lever 53 emitting a corresponding zero signal, that therefore indicates that the validating machine 10 is in its correct zero or initial setting position, from which to start to perform all the other subsequent operations of the validating machine 10.

With the validating machine 10 in this configuration, and during step S2, a document or cheque 13 is inserted manually, or dropped under the force of gravity into the vertical guide 11, where the cheque 13 is received and stopped by arms 22a and 22b, arranged as stated before, crosswise to the vertical path defined by guide 11.

Therefore the cheque 13 rests and stops, along its related lower edge 13a, against the arms 22a and 22b, and at the same time assuming a determined first position indicated with P1 in FIG. 3a, and also called hold position.

Consequently, in position P1, the cheque 13 results perfectly aligned with respect to a predetermined reference line defined by arms 22a and 22b.

When the cheque 13 comes into contact with the arms 22a and 22b, the two sensors 23a and 23b associated with said arms are immediately activated, and during step S3, they emit two corresponding signals SG1 and SG2 towards the control unit 81 of the validating machine 10, to signal the presence and alignment of the cheque in position P1.

In turn, in response to these SG1 and SG2 signals, the control unit 81 of the validating machine 10, immediately activates the command device 51 and commands, by means of motor 55, a clockwise rotation by a predetermined amount of command member 52, as shown by arrow f9 (FIGS. 3b and 6), after which the command member 52 stops.

Therefore, the control unit 81 activates the command device 51 only in response to the simultaneous presence of the two SG1 and SG2 signals emitted by the respective sensors 23a and 23b, in other words, only when the cheque 13 makes contact along the lower edge 13a with both arms 22a and 22b, and is thus correctly positioned in the guide 11 and correctly aligned in a horizontal direction in position P1.

The amount of this clockwise rotation of the command member 52 is such that the pin 53d of the lever 53, as it slides along the external profile 52d, and passes through the sloping intermediate portion 52i, moves from the initial zero position C1 adjacent to end 52e, to a new position C2 (FIG. 6) arranged along the cylindrical portion 52h of the external profile 52d, furthest from the rotation axis 52a, where the pin 53d stops.

In particular during its progress, this clockwise rotation of a predetermined amount of the command member 52, commands, through the internal profile 52c in cooperation with arm 17, a corresponding clockwise rotation of the movable structure 15 about axis 35a, as shown by arrows f10 (FIG. 3b).

In turn, this clockwise rotation of the movable structure 15 causes the two idle rollers 42a and 42b to close against the corresponding drive rollers 44a and 44b, to retain and firmly maintain the cheque 13 in the hold position P1, during step S4, as shown in FIG. 3b.

As a result of the movable structure 15 rotation, the print head moves from rest position P10, set back, to a new position P11, also called work position, with the front surface 32b of the print head 32 positioned adjacent to the cheque 13, which constitutes the work position in which the print head 32 is suitable to cooperate with the cheque 13 to be validated.

Furthermore, at the same time, this clockwise rotation of the cam command member 52 also determines, through the sloped portion 52i of the external profile 52d, a corresponding counter-clockwise rotation of the lever 53, that in turn produces, by means of the sector gear 53b meshed with the toothed wheel 25, an counter-clockwise rotation of approximately 90 degrees in a downward direction of the two arms 22a and 22b, as shown by arrow f5 (FIGS. 3b and 5).

Therefore, as shown by a step S5, the two arms 22a and 22b are immediately rotated and moved away from their contact with the lower edge 13a of the cheque 13, while also entraining in their 90 degree rotation the front parts 26a of the articulated levers 26 of the respective sensors 23a and 23b, thus freeing the vertical travel path of the cheque 13 in a downward direction towards the printing zone.

The two cam profiles, internal and external, respectively 52c and 52d are suitably out of phase with respect to each other so that with the progress of the cam member 52 rotation, the cheque 13 is already firmly held and blocked between the rollers 42a-42b and 44a-44b, when arms 22a and 22b are moved away from the lower edge 13a of the cheque 13 by the command lever 53 rotating.

Immediately thereafter and automatically, during step S6, the control unit 81 of the validating machine 10 commands the rotation of the feeding motor 45 to determine by means of the motorised rollers 44a and 44b, a predetermined travel in a downward direction of the cheque 13, as shown by an arrow f3, until the cheque is moved to a determined position P2 (FIG. 3c), at the correct height in a vertical direction with respect to the print head 32, to allow the cheque 13 to be correctly printed and therefore validated by the print head 32.

Figure 3C:
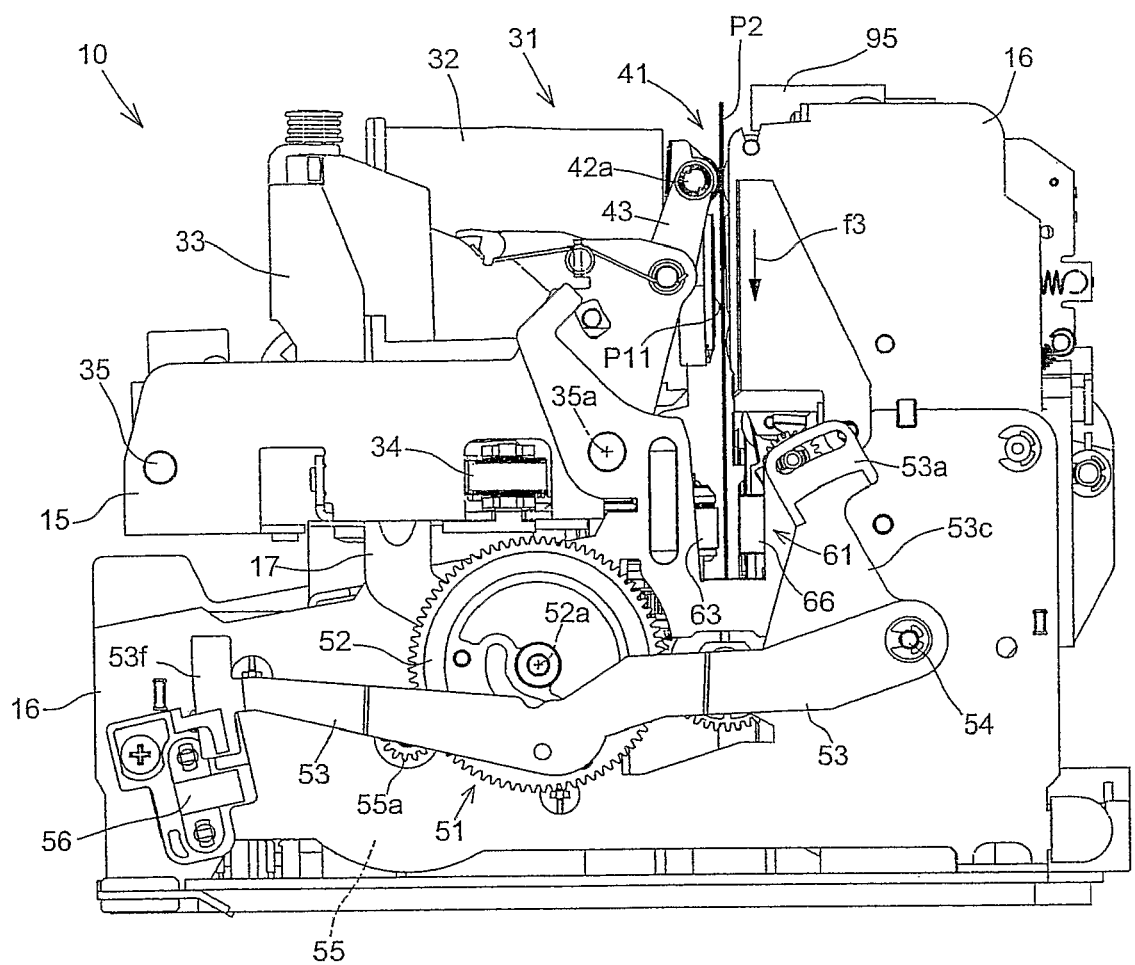
FIG. 3c is a third side view of the validating machine in FIG. 2, shown in a third configuration with the document completely inserted in the validating machine in the vertical direction, still retained by the vertical feeder device, and positioned for validation in a validation zone facing a printing unit.
Figure 3D:
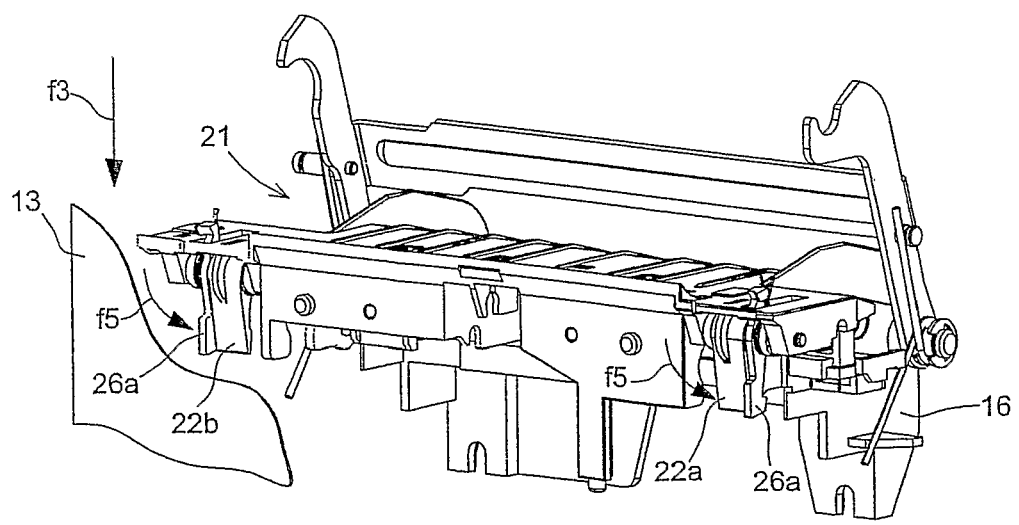
FIG. 3d is a perspective view of certain internal parts of the validating machine in the configuration shown in FIG. 3c.

For greater clarity, FIG. 3d shows the situation wherein the arms 22a and 22b of the alignment device 21, together with the front parts 26a of the respective presence sensors 23a and 23b, are rotated in a downward direction by 90 degrees with respect to the stop position of the cheque 13, and the latter is fed vertically downwards in the direction of the arrow f3.

At this point, the control unit 81 commands the printing of the cheque 13, and in particular, by means of the travel device 37, a translation of the print head 32 in relation to the cheque 13 in order to print one line on the cheque, indicating the completed validation of the cheque 13 as indicated in step S7.

The cheque 13, once it has been positioned in the printing zone, in other words in the determined position P2, can be processed in various modes of different levels of complexity.

For example, according to a first particularly simple basic mode, after the cheque 13 has been validated in position P2 by the print head 32, as described above, it is not subjected to any further processing, rather is immediately driven out of the validating machine 10.

Therefore, in this case, the validated cheque 13 is fed by the feeder device 41 in a vertical upward direction during a step S8, causing the pairs of rollers 42a-42b, and 44a-44b rotate in the opposite direction to the downward feeding direction, as shown schematically by an arrow f4, until the cheque 13 exits and is released from the hold of the pairs of rollers 42a-42b and 44a-44b to freely rest along the lower edge 13a onto these rollers, assuming a corresponding release position P3 (FIG. 3f) where the validated cheque 13 can be easily removed by the user.

At this point, the cheque 13, during step S9, is removed manually from the validating machine 10, while at the same time, the removal is signalled by sensor 95 to the control unit 81, which in response, automatically activates a new reset cycle of the validating machine 10, so that it comes in the setting shown in FIG. 3a once again, and therefore ready to receive a new cheque 13 to be validated.

For this purpose, the control unit 81 commands through motor 55, a counter-clockwise rotation of the command member 52, until the validating machine 10 and its various components are brought back to resetting, in other words, with arms 22a and 22b once again oriented perpendicular to the vertical guide 11 in order to stop the cheque 13 coming from above, with the idle rollers 42a-42b at a distance from the drive rollers 44a-44b, with the pin 53d placed in position C1 in the zone of the end of cam 53d, and lastly, with the lever 53 once again placed in its initial position corresponding to the zero signal generated by sensor 56. At this point, the operating cycle of the validating machine 10 is repeated according to the description above, for each new document to be validated.

As an alternative to the basic mode described above, and according to a more sophisticated management mode, the cheque 13, upon reaching the predetermined position P2, at the correct height in a vertical direction with respect to the printing assembly 31, is engaged during step S11 by the horizontal travel mechanism 61 to be moved horizontally in both directions, as shown by the double arrow f2 (FIG. 7).

For this purpose, after the cam command member 52 has completed the first rotation of a predetermined amount that places the pin 52d in position C2 along cam 52d, and after the feeder mechanism 41 has fed the cheque 13 into position P2, the control unit 81 reactivates the motor 55 to command a further rotation of the cam command member 52 for a predetermined amount in a clockwise direction, namely once again in the direction of the arrow f9, to cause the pin 53d to slide along the cylindrical portion 52h of the cam 52d, from position C2 to a new position C3 (FIG. 6) adjacent to the closed end 52e of the portion 52h.

During this further rotation of the command member 52, the pin 53d, as stated previously, slides along the cylindrical portion 52h.

In this manner, the command lever 53 is not subject to rotation about the fulcrum 54, and therefore the arms 22a and 22b also continue to remain in the position rotated by 90 degree, so that they do not interfere with the vertical guide 11, and therefore do not interfere with the cheque 13 contained therein.

Again during this further rotation of command member 52, while the pin 53d slides along the portion 52h to reach position C3, the rotation of motor 55 commands, through the gear chain 71, the engagement mechanism 65, and in particular it commands a rotation of the shaft 72 such as to bring the two counter rollers 66 in engagement with the belt 63, as shown by arrow f7 (FIGS. 7 and 3e) with the interposed cheque 13 in position P2.

At the same time, the internal closed profile 52c of the command member 52 commands through arm 17 a determined rotation in counter-clockwise direction of the movable structure 15 about axis 35a, as shown by arrow f16, and therefore the release of the pairs of rollers 42a-42b and 44a-44b from the cheque 13, that is thus free at the top and can thus be moved without interference in a horizontal direction by mechanism 61.

Figure 3E:
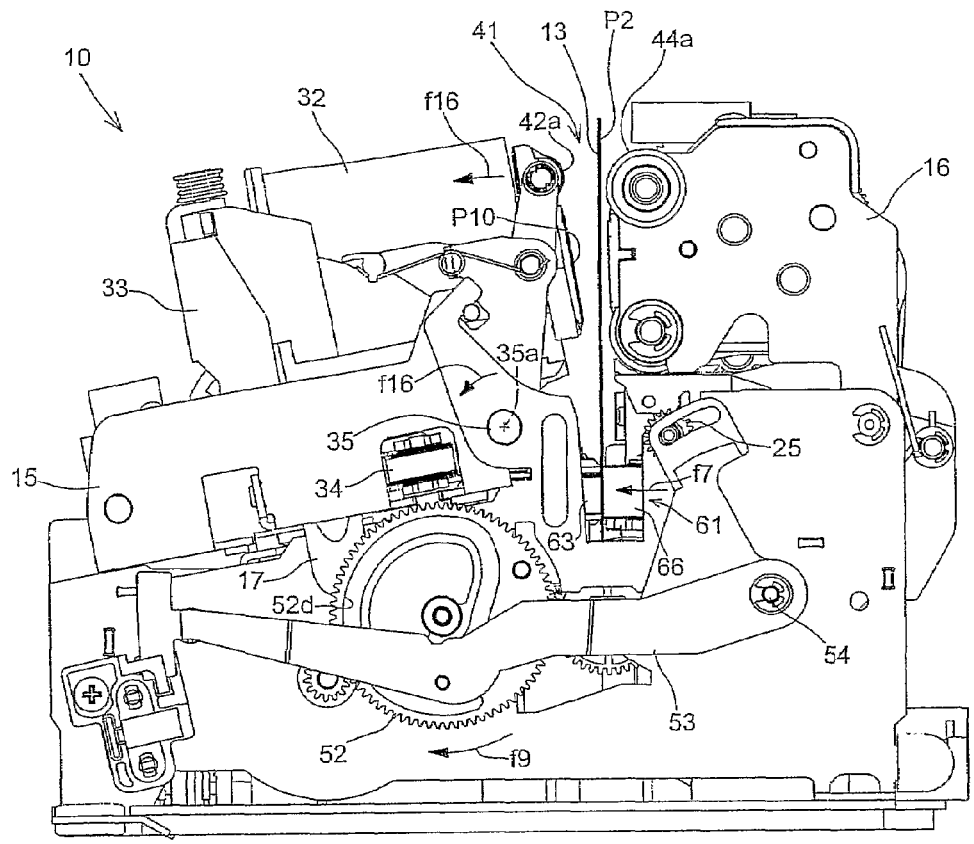
FIG. 3e is a fourth side view of the validating machine in FIG. 2, shown in a fourth configuration with the document released from the vertical feeder device and retained on both sides by a device for transferring it in a horizontal direction.

On completion of this step S11, the validating machine 10 assumes the configuration shown in FIG. 3e.

During the following step S12, the control unit 81 activates the motor 62 to rotate the pulley 68 in both directions and therefore determine a corresponding translation of the belt 63, as shown by the double arrow f14, so that the cheque 13 is pulled back and forth in a horizontal direction.

In this manner, the validating machine 10 can offer a greater number of possibilities for handling the cheque 13, once it has been inserted therein, and thus to validate it.

For example, as has already been stated previously, by horizontally translating the cheque 13 with respect to the printing zone, it is possible to print data along the total length of the cheque, even when this length is greater than the printing stroke of the print head 32.

Moreover, by horizontally translating the cheque 13 in front of the optional MICR unit 76, it is possible to read any data recorded in magnetic form on the cheque 13, or to perform other operations depending on the type of validation to be performed.

In general these validation operations correspond with step S13.

Once the cheque 13 has been validated, it is brought back by the travel mechanism 61 to the same position P2, from where it was picked up for the horizontal movement.

At this point, during step S14, the control unit 81 commands the release of the mechanism 61 from the cheque 13 and the simultaneous engagement of the vertical feeder rollers with the cheque.

For this purpose, the motor 55 is activated to command a counter-clockwise rotation of the command member 52 by a predetermined angular amount, as shown by arrow f15 (FIGS. 6 and 3f) in order to determine through the gears 71a corresponding rotation of shaft 72, namely of the protruding elements 73, to move the frame 69 away in the direction of the arrow f8 (FIGS. 7 and 3f) and therefore cause the counter-rollers 66 to move away from the belt 63.

At the same time, in other words, during this command member 52 counter-clockwise rotation, the related internal profile 52c, cooperating with the pin 17a of arm 17, rotates the movable structure 15 in a clockwise direction about axis 35a, as shown by arrows f17 (FIG. 3f), in order to bring the rollers 42a-42b in engagement with the corresponding rollers 44a-44b, with the validated cheque 13 interposed between them.

Again, upon this predetermined counter-clockwise rotation of the command member 52, the pin 53d of lever 53 is moved along the external profile 53d from position C3 back to position C2.

In this way the validating machine 10 returns to a setting that corresponds with that shown in FIG. 3c, wherein cheque 13, now validated and placed in position P2, is engaged from above by the pairs of rollers 42a-42b and 44a-44b, and is therefore ready to be driven out of the validating machine 10.

Therefore, from this stage onwards, the cheque 13 is processed in a manner similar to the basic mode described above, and in particular during step S16, which is analogous to step S8, the cheque is fed vertically upwards to rest on the rollers 42a-42b and 44a-44b so that it can be removed freely during step S17.

Lastly, upon removal of the validated cheque 13, the validating machine 10 automatically performs a new reset cycle through another counter-clockwise rotation of command member 52 in the direction of the arrow f15, thus reaching the setting shown in FIG. 3a once again, and in particular, with the pairs of rollers 42a-42b and 44a-44b at a mutual distance, the arms 22a-22b oriented crosswise with respect to the guide 11, and the pin 53d positioned adjacent to the end 52e of the external profile 53d, and therefore the validating machine is ready to receive and stop a new cheque 13 from above, to be validated during a new validation cycle according to the methods described previously.

Therefore the validating machine 10 is configured so that when the document or cheque 13 is inserted manually into the vertical guide 11, it is not received immediately in a validation position in front of the print head, rather it is received in a preliminary position, located above the validation position, and whereat the inserted cheque is aligned, and where its correct alignment is also ascertained.

Only upon ascertaining the correct alignment in guide 11, at the preliminary position, is the cheque 13 processed by the validating machine 10, and in particular, moved to the validation position in front of the print head to actually be validated.

Therefore, thanks to this configuration, the validating machine ensures correct cheque alignment before proceeding with any validation operations, and is also such as to leaves a portion of the cheque protruding from the top of the guide 11, thus permitting good manual control by the user during the insertion step into the vertical guide 11, as well as facilitating the correct resting and alignment in the vertical guide 11.

The invention claimed is:

1. Apparatus for processing a sheet, comprising:
a vertical guide for inserting said sheet;
a stop member to stop said sheet in a hold position along said vertical guide, said stop member being suitable for contact cooperation with a lower edge of said sheet;
a presence sensor to detect the presence of said sheet in said hold position, said presence sensor being also suitable to detect the alignment of said sheet in said hold position with respect to a predetermined reference line;
a transfer device that can be selectively engaged with said sheet; and
a processing member suitable to perform an operation on said sheet,
characterised in that:
said processing member is placed at a processing position of said sheet spatially separated from said hold position;
said stop member can be switched from a stop position of said lower edge to a release position of said lower edge; and
said transfer device is provided to transfer said sheet from said hold position to said processing position, and
in that said processing apparatus further comprises:
a control and command device associated with said stop member and with said transfer device, suitable to command switching of said stop member from said stop position to said engagement position, and the action of said transfer device, in response to the detection of the presence and alignment of said sheet in said hold position by said presence sensor;
wherein said presence sensor comprises two distinct sensitive elements, longitudinally spaced and arranged along said predetermined reference line to detect the alignment of the lower edge of said sheet in contact with said stop member.

2. Apparatus according to claim 1, wherein said control and command device is suitable to command switching of said transfer device of said sheet from an open configuration, suitable for the insertion of said sheet into said vertical guide, to a closed configuration, engaged with said sheet in said hold position, in response to the detection of the presence and alignment of said sheet in said hold position by said presence sensor.

3. Apparatus according to claim 2, wherein said control and command device comprises an electronic control unit and a command assembly suitable to be controlled by said electronic control unit,
wherein said command assembly is provided to command both switching of said transfer device from said open configuration to said closed configuration, and switching of said stop member from said stop position to said release position, and
wherein said electronic control unit in turn is provided to activate said transfer device, in order to transfer said sheet from said hold position to said processing position.

4. Apparatus according to claim 3, wherein said transfer device comprises first transfer members and second transfer members arranged along two opposite sides of said vertical guide and respectively supported by a fixed structure and by a movable structure of said processing apparatus, and
wherein said command assembly comprises a command member having a first cam which is suitable to selectively move said movable structure in relation to said fixed structure to cause switching of said first and second transfer members between said open configuration and said closed configuration, and a second cam which is suitable to command switching of said stop member between said stop position and said release position.

5. Apparatus according to claim 4, wherein said first transfer members comprise at least one pair of drive rollers rotating on said fixed structure, and said second transfer members comprise at least a pair of idle rollers rotating on said movable structure.

6. Apparatus according to claim 2, wherein said processing member can be switched, together with said transfer device, between a rest position corresponding with the open configuration of said transfer device and such as not to hinder the zone of said vertical guide, and an operating position corresponding with the closed configuration of said transfer device and suitable for the cooperation of said processing member with said sheet in said processing position.

7. Apparatus according to claim 1, wherein said transfer device is suitable to translate said sheet from said hold position to said processing position parallel to said predetermined reference line.

8. Apparatus according to claim 1, wherein said processing position is below said hold position.

9. Apparatus according to claim 1, wherein said presence sensor is of the type suitable to emit at least a signal indicating the presence and alignment of said sheet in said hold position.

10. Apparatus according to claim 1, wherein said two sensitive elements are each suitable to generate a respective signal, and wherein the simultaneous presence of said two signals is interpreted by said control and command device as indicating the completed alignment of said sheet in said hold position.

11. Apparatus according to claim 1, comprising an hold and alignment device associated with said stop member,
wherein said stop member includes at least two rotating arms, suitable to jointly rotate, and normally arranged at said stop position to stop and align said sheet in said hold position, and
wherein, when said presence sensor detects the presence and alignment of said sheet in said hold position, in contact with said rotating arms, said command device is configured to activate said hold and alignment device in a manner to rotate said rotating arms from said stop position to said release position in order to free the travel path of said sheet towards the zone of said processing member.

12. Apparatus according to claim 11, wherein said presence sensor comprises two sensitive elements, each being associated with a respective rotating arm to emit a signal indicating the presence of said sheet in contact with the respective rotating arm.

13. Apparatus according to claim 12, wherein said sensitive elements are of the type suitable to react to the weight of said sheet.

14. Apparatus according to claim 1, further comprising a horizontal transfer device to move in a horizontal direction said sheet after its insertion into said processing apparatus, said horizontal transfer device being switchable from a rest configuration, released from and suitable to receive said sheet, to an operating configuration, engaged with said sheet.

15. Apparatus according to claim 14, wherein with said sheet placed in said processing position, said control and command device is configured to switch said horizontal transfer device from said resting configuration to said operating configuration, and to simultaneously release said transfer device from said sheet, and wherein, during the horizontal motion of said sheet, said control and command device is further configured to retain said stop member in a configuration that corresponds with said release position, at a distance from said sheet.

16. Apparatus according to claim 15, wherein said control and command device comprises a command member having a cam, in order to maintain said stop member at a distance from said sheet when said horizontal transfer means are moving said sheet.

17. Apparatus according to claim 14, wherein said horizontal transfer device is provided to emit said sheet sideways towards the exterior of said apparatus after it has been processed by said processing member.

18. Apparatus according to claim 14, wherein said horizontal transfer device comprises a motorised belt configured to travel according to a closed travel path, and at least one pressing counter-roller, and wherein said motorised belt is suitable to cooperate with said pressing counter-roller, when the sheet is interposed between them, to move the latter in a horizontal direction.

19. Apparatus according to claim 18, comprising at least one pair of pressing counter-rollers suitable to cooperate with a straight portion of said belt along the relative travel path.

20. Apparatus according to claim 1, wherein said transfer device is provided to release said sheet in an upward direction after it has been processed by said processing member.

21. Apparatus according to claim 1, wherein said processing member comprises a printing device.

22. Apparatus according to claim 1, wherein said processing apparatus is comprised of a validating machine for documents in the form of sheets, and said processing member is comprised of a validating device for said documents.

23. Apparatus according to claim 1, incorporating a device for printing on a paper tape fed from a roll, wherein said stop member comprises at least two protruding elements movable between said stop position and said release position, and said paper tape is configured to travel along a respective travel path passing between said two protruding elements.

24. Method for feeding a sheet in a processing apparatus of the type having a vertical guide and a processing member, said method comprising:
   inserting said sheet from above into said vertical guide, stopping said sheet in a hold position along said vertical guide, in contact cooperation with a lower edge of said sheet;
   detecting the presence of said sheet in said hold position and the alignment of the lower edge thereof with respect to a predetermined reference line;
upon completed detection of the presence and alignment of said sheet:
   retaining said sheet in said first hold position;
   releasing the lower edge of said sheet from the stop condition;
   transferring said sheet from said hold position to a processing position suitable for the cooperation between said sheet and said processing member; and
   switching said processing member from a rest position, such as not to hinder the zone of said vertical guide and therefore to facilitate the insertion of said sheet thereinto, to an operating position suitable for cooperation between said processing member and said sheet in said processing position.

25. Method according to claim 24, wherein the step of retaining said sheet in said hold position includes a step of switching a transfer device of said sheet from an open configuration, suitable for the insertion of said sheet into said vertical guide, to a closed configuration, engaged with said sheet in said hold position.

26. Method according to claim 24, further comprising, after the sheet has reached said processing position:
   engaging said sheet with a device for the transfer of said sheet in a horizontal direction;
   releasing, at the same time, said sheet from other devices suitable to prevent the movement in an horizontal direction of said sheet; and
   subsequently transferring said sheet in a horizontal direction.

27. Alignment and feeder device for sheets, comprising:
   a vertical guide for the insertion from above of a sheet, dropped under the force of gravity;
   a stop member associated with said vertical guide and movable between a stop position, wherein said stop member is in contact cooperation with a lower edge of said sheet to stop and align said sheet in a determined hold position, and a release position, wherein said stop member does not stop said sheet and therefore allows its travel downstream of said stop member;
   a presence sensor for detecting the presence and alignment of said sheet in said hold position with respect to a predetermined reference line; and
   a transfer device of said sheet, associated with said vertical guide,
   said alignment and feeder device being characterised in that said presence and alignment sensor comprises at least two sensitive elements, each of which is provided to emit a corresponding signal when said sheet is in contact with said stop member,
   wherein, in response to the presence of both signals emitted by said sensitive elements said transfer device is switched from an open configuration, suitable for the insertion of said sheet into said vertical guide, to a closed configuration, engaged with said sheet,
   said stop member is switched from said stop position to said release position, and furthermore
   said transfer device is activated to feed said sheet towards the zone downstream of said stop member.

28. Alignment and feeder device according to claim 27, wherein said stop member comprises at least two movable arms, and each of said two sensitive elements is associated with a respective movable arm to emit the corresponding signal when the sheet is in contact with the respective movable arm.

29. Alignment and feeder device according to claim 28, wherein said two movable arms are normally arranged in said stop position and are provided to jointly rotate in a downward direction from said stop position to said release position, in response to the simultaneous presence of the two signals emitted by the said two sensitive elements.

30. Alignment and feeder device according to claim 27, wherein said two sensitive elements are sensitive to the weight of said sheet.

31. Method for alignment and feeding of a sheet dropped under the force of gravity into a vertical guide, comprising the following steps:
   stopping and aligning said document in said vertical guide by means of a stop member by contact cooperation with a lower edge of said document; and
   detecting the presence and alignment of said document, in contact with said stop member, with respect to a predetermined reference line;

wherein said step of detecting the presence and alignment of said document comprises emitting two signals indicating the contact of two distinct points on the lower edge of said document with said stop member, and
wherein in response to the simultaneous presence of said two signals, said method further comprises the following steps:

retaining said document in said vertical guide;
moving said stop member away from said lower edge; and
feeding said document towards the zone downstream of said stop member.

* * * * *